United States Patent
Wu et al.

(10) Patent No.: US 11,546,885 B2
(45) Date of Patent: Jan. 3, 2023

(54) SIDELINK RADIO FRAME TIMING SYNCHRONIZATION

(71) Applicant: QUALCOMM Incorporated, San Diego, CA (US)

(72) Inventors: Shuanshuan Wu, San Diego, CA (US); Kapil Gulati, Hillsborough, NJ (US); Navid Abedini, Somerset, NJ (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/738,987

(22) Filed: Jan. 9, 2020

(65) Prior Publication Data

US 2020/0267692 A1    Aug. 20, 2020

Related U.S. Application Data

(60) Provisional application No. 62/805,860, filed on Feb. 14, 2019.

(51) Int. Cl.
*H04W 72/04* (2009.01)
*H04W 56/00* (2009.01)
*H04W 8/00* (2009.01)

(52) U.S. Cl.
CPC .......... *H04W 72/04* (2013.01); *H04W 8/005* (2013.01); *H04W 56/001* (2013.01); *H04W 56/0005* (2013.01)

(58) Field of Classification Search
CPC ..... H04W 56/001; H04W 8/005; H04W 4/44; H04W 4/40
See application file for complete search history.

(56) References Cited

U.S. PATENT DOCUMENTS

| | | | |
|---|---|---|---|
| 2015/0117295 A1 | 4/2015 | Yeh et al. | |
| 2016/0374039 A1 | 12/2016 | Khoryaev et al. | |
| 2017/0078991 A1* | 3/2017 | Chae | H04W 48/20 |
| 2017/0135055 A1 | 5/2017 | Seo | |
| 2017/0150314 A1* | 5/2017 | Hwang | G01S 5/00 |
| 2018/0279325 A1 | 9/2018 | Huang et al. | |
| 2018/0324882 A1 | 11/2018 | Gulati et al. | |
| 2019/0045345 A1* | 2/2019 | Lee | H04W 4/06 |
| 2019/0045474 A1* | 2/2019 | Li | H04W 56/0045 |

(Continued)

OTHER PUBLICATIONS

International Search Report and Written Opinion—PCT/US2020/013067—ISA/EPO—Apr. 16, 2020.

*Primary Examiner* — Raj Jain
(74) *Attorney, Agent, or Firm* — Loza & Loza, LLP/Qualcomm Incorporated

(57) ABSTRACT

Aspects of the disclosure relate to mechanisms for sidelink radio frame timing synchronization in a sidelink network. In some examples, a sidelink device may detect a sidelink synchronization signal (S-SS) transmitted by another sidelink device over a sidelink carrier and determine the sidelink reception timing of the radio frame carrying the S-SS based on the S-SS. The sidelink device may then determine a timing advance value indicative of a propagation delay between the sidelink devices and calculate the sidelink transmission timing of a radio frame within which the sidelink device may transmit information based on the sidelink reception timing and the timing advance value.

30 Claims, 16 Drawing Sheets

(56) References Cited

U.S. PATENT DOCUMENTS

| | | | |
|---|---|---|---|
| 2019/0289561 A1* | 9/2019 | Corley | H04W 24/02 |
| 2019/0289627 A1* | 9/2019 | Blasco Serrano | H04W 56/00 |
| 2020/0229194 A1* | 7/2020 | Belleschi | H04L 5/0064 |
| 2020/0267692 A1* | 8/2020 | Wu | H04W 4/44 |
| 2021/0352599 A1* | 11/2021 | Kusashima | G01S 19/256 |

* cited by examiner

SIDELINK RADIO FRAME TIMING SYNCHRONIZATION

PRIORITY CLAIM

This application claims priority to and the benefit of Provisional Patent Application No. 62/805,860, entitled "Sidelink Radio Frame Timing Synchronization," filed in the U.S. Patent and Trademark Office on Feb. 14, 2019, the entire contents of which are incorporated herein by reference as if fully set forth below in their entirety and for all applicable purposes.

TECHNICAL FIELD

The technology discussed below relates generally to wireless communication networks, and more particularly, to sidelink wireless communication.

INTRODUCTION

In many existing wireless communication systems, a cellular network is implemented by enabling wireless user equipment to communicate with one another through signaling with a nearby base station or cell. As a user equipment moves across the service area, handovers take place such that each user equipment maintains communication with one another via its respective cell.

Another scheme for a wireless communication system is a mesh or peer to peer (P2P) network, in which wireless user equipment may signal one another directly, rather than via an intermediary base station or cell. Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

As the demand for sidelink communication increases, research and development continue to advance sidelink technologies not only to meet the growing demand for sidelink, but also to advance and enhance the vehicle driving experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for sidelink radio frame timing synchronization in a sidelink network. In some examples, a sidelink device may detect a sidelink synchronization signal (S-SS) transmitted by another sidelink device over a sidelink carrier and estimate the sidelink reception timing of the radio frame carrying the S-SS based on the S-SS. The sidelink device may then determine a timing advance value indicative of a propagation delay between the sidelink devices and calculate the sidelink transmission timing of a radio frame within which the sidelink device may transmit information based on the sidelink reception timing and the timing advance value. In an example, the timing advance value may be determined based on one or more of a reference signal received power (RSRP) associated with the S-SS, a distance between the sidelink devices, or the congestion level of sidelink resources on the sidelink carrier.

In one example, a method for wireless communication at a first sidelink device is disclosed. The method includes detecting a sidelink synchronization signal received via a received radio frame over a sidelink carrier. The sidelink synchronization signal originates from a second sidelink device. The method further includes determining sidelink reception timing associated with the received radio frame based on the sidelink synchronization signal, determining a timing advance value indicative of a propagation delay from the second sidelink device to the first sidelink device, calculating sidelink transmission timing based on the sidelink reception timing and the timing advance value, and transmitting information within a transmitted radio frame over the sidelink carrier based on the sidelink transmission timing.

Another example provides a first sidelink device. The first sidelink device includes a processor, a wireless transceiver communicatively coupled to the processor and configured to communicate over a sidelink carrier, and a memory communicatively coupled to the processor. The processor and the memory are configured to detect a sidelink synchronization signal received via a received radio frame over a sidelink carrier. The sidelink synchronization signal originates from a second sidelink device. The processor and the memory are further configured to determine sidelink reception timing associated with the received radio frame based on the sidelink synchronization signal, determine a timing advance value indicative of a propagation delay from the second sidelink device to the first sidelink device, calculate sidelink transmission timing based on the sidelink reception timing and the timing advance value, and transmit information within a transmitted radio frame over the sidelink carrier based on the sidelink transmission timing.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
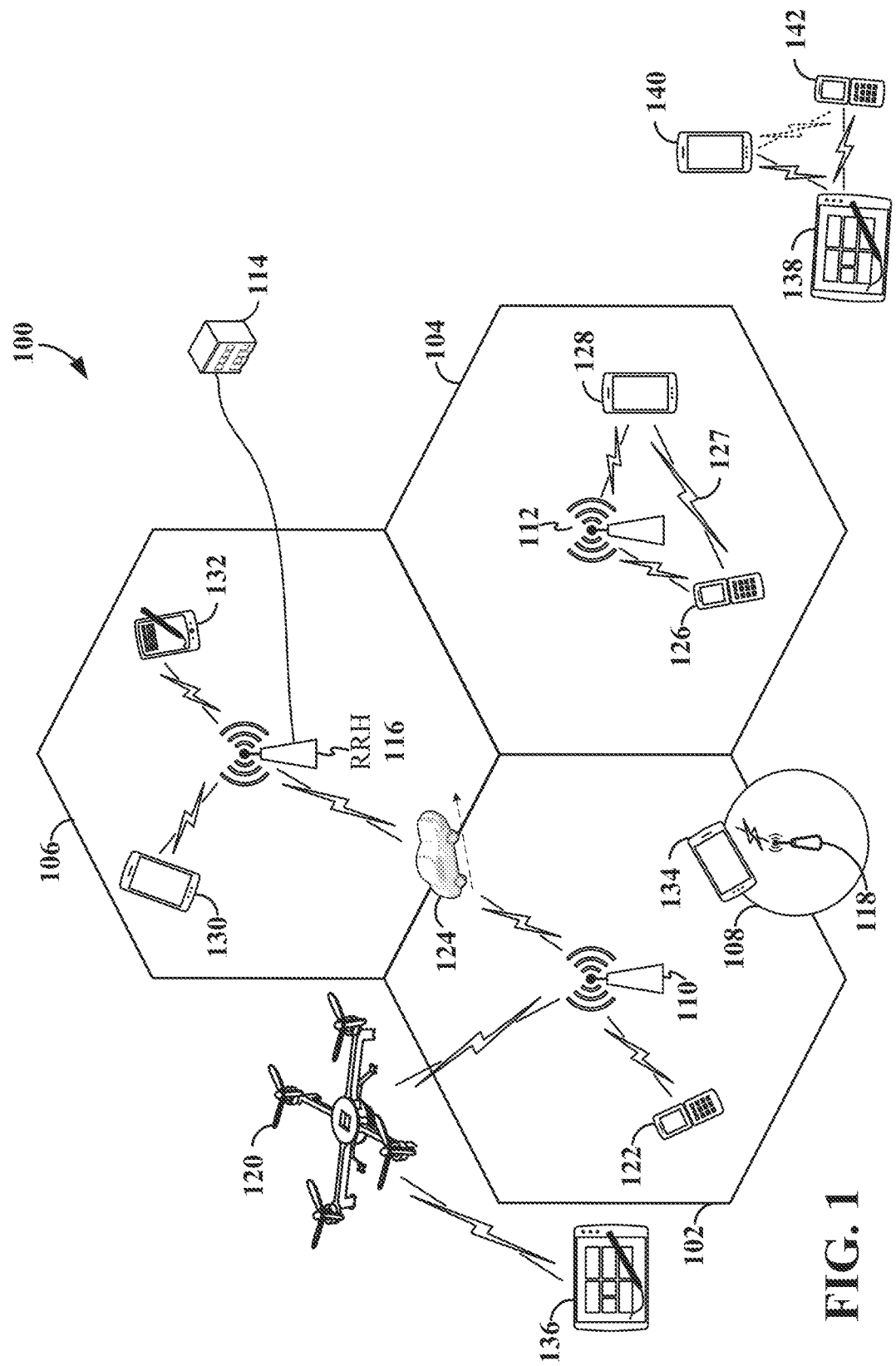
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some aspects of the present disclosure, two or more UEs (e.g., UEs 126 and 128) within the coverage area of a serving base station 112 may communicate with each other using sidelink signals 127 without relaying that communication through the base station. In this example, one or both of the UEs 126 and 128 may function as scheduling entities to schedule sidelink communication therebetween. For example, UEs 126 and 128 may communicate sidelink signals 127 within a V2X network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
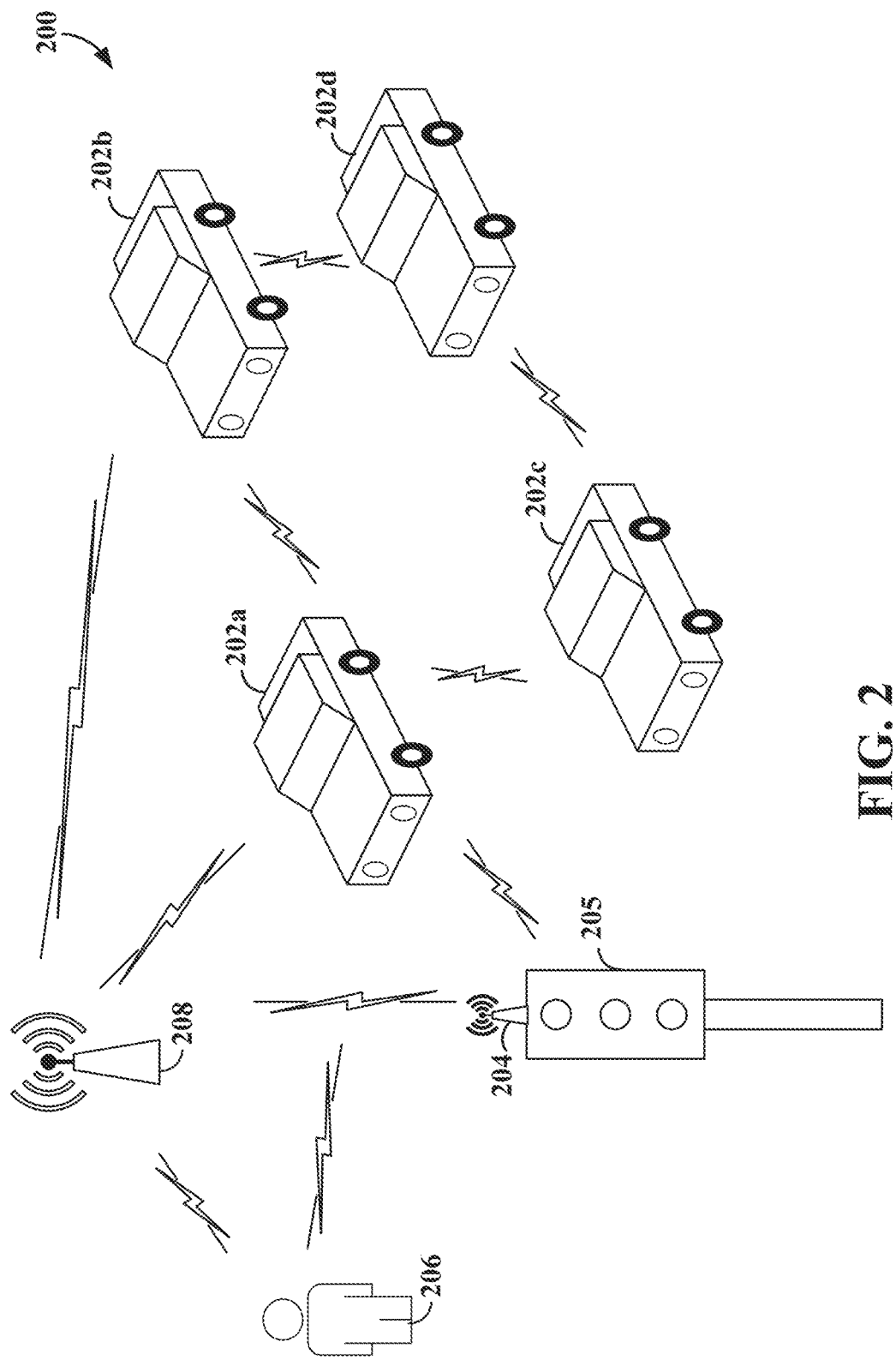
FIG. 2 is a diagram illustrating an example of a vehicle-to-everything (V2X) wireless communication network according to some aspects.

FIG. 2 illustrates an example of a vehicle-to-everything (V2X) wireless communication network 200. A V2X network can connect vehicles 202a-202d to each other (vehicle-to-vehicle (V2V)), to roadway infrastructure 204/205 (vehicle-to-infrastructure (V2I)), to pedestrians/cyclists 206 (vehicle-to-pedestrian (V2P) (e.g., mobile devices, such as user equipment (UE) and/or wearables of pedestrians/cyclists)), and/or to the network 208 (vehicle-to-network (V2N)).

A V2I transmission may be between a vehicle (e.g., vehicle 202a) and a roadside unit (RSU) 204, which may be coupled to various infrastructure 205, such as a traffic light, building, streetlight, traffic camera, tollbooth, or other stationary object. The RSU 204 may act as a base station enabling communication between vehicles 202a-202d, between vehicles 202a-202d and the RSU 204 and between vehicles 202a-202d and mobile devices 206 of pedestrians/cyclists. The RSU 204 may further exchange V2X data gathered from the surrounding environment, such as a connected traffic camera or traffic light controller, V2X connected vehicles 202a-202d, and mobile devices 206 of pedestrians/cyclists, with other RSUs 204 and distribute that V2X data to V2X connected vehicles 202a-202d and pedestrians 206. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 204.

Such V2X data may enable autonomous driving and improve road safety and traffic efficiency. For example, the exchanged V2X data may be utilized by a V2X connected vehicle 202a-202d to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device 206 of a pedestrian/cyclist may be utilized to trigger a warning sound, vibration, flashing light, etc., in case of imminent danger.

V2N communication may utilize traditional cellular links to provide cloud services to a V2X device (e.g., within a vehicle 202a-202d or RSU 204, or on a pedestrian 206) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 204.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
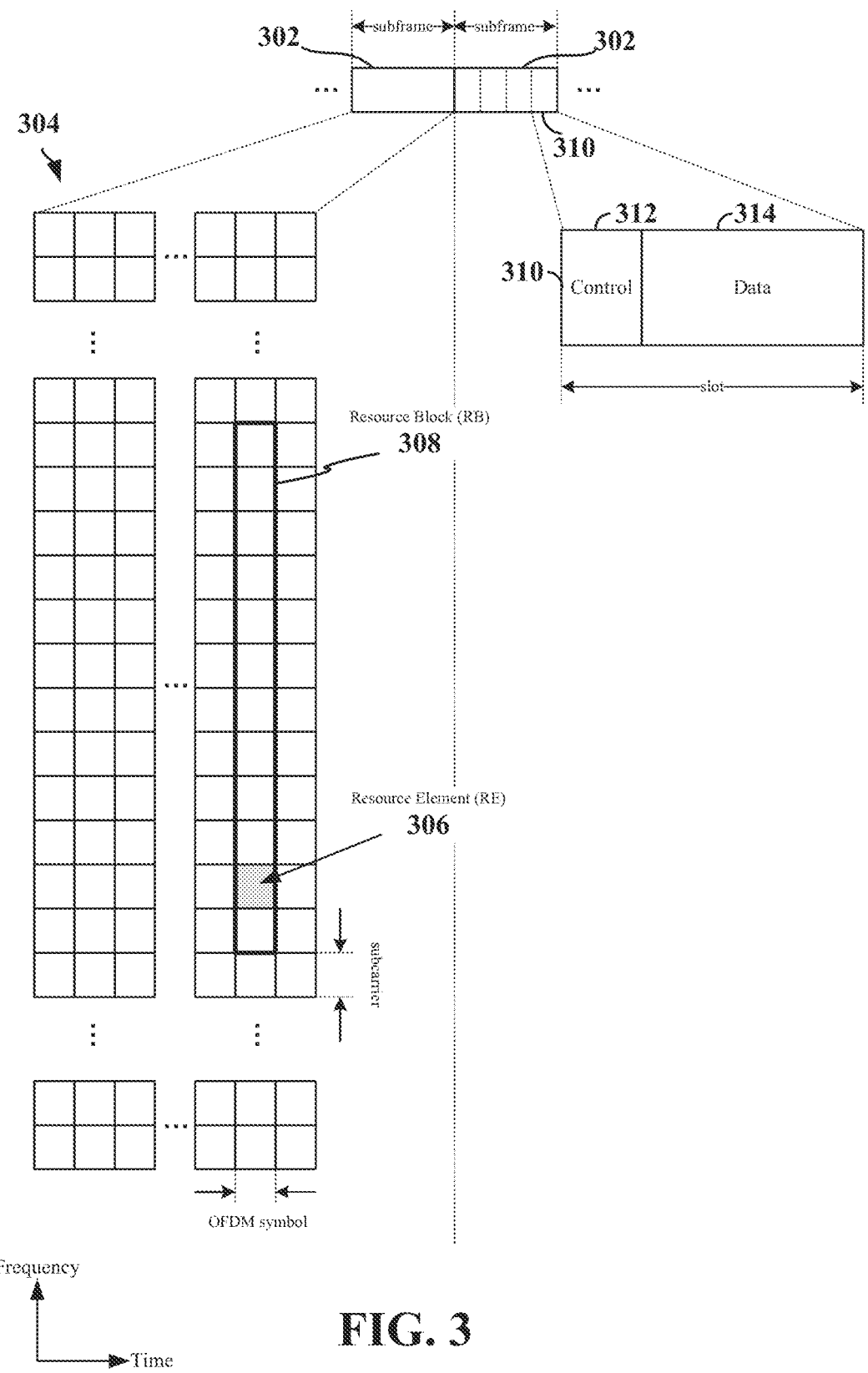
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or V2X devices for downlink, uplink, or sidelink transmissions typically involves scheduling one or more resource elements 306 within one or more subbands. Thus, a UE or V2X device generally utilizes only a subset of the resource grid 304. In some examples, an RB may be the smallest unit of resources that can be allocated to a UE/V2X device. Thus, the more RBs scheduled for a UE/V2X device, and the higher the modulation scheme chosen for the air interface, the higher the data rate for the UE/V2X device. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
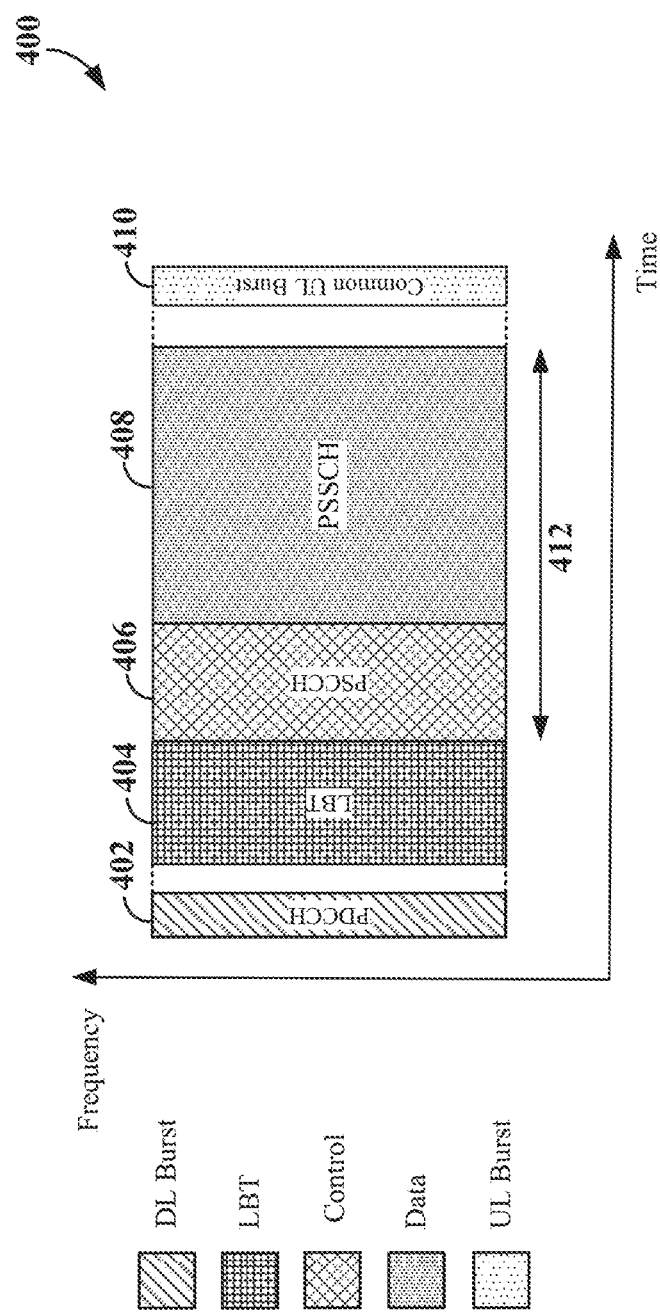
FIG. 4 illustrates an example of a slot that may be utilized to communicate over a sidelink carrier according to some aspects.

In various aspects of the disclosure, sidelink wireless communications may be transmitted over a sidelink carrier including spectrum that is time-divided into a plurality of slots. FIG. 4 illustrates an example of a slot 400 that may be utilized to communicate over such a sidelink carrier. In the example shown in FIG. 4, time is illustrated along a horizontal axis, while frequency is illustrated along a vertical axis. In some examples, the slot 400 may correspond to the slot 310 shown in FIG. 3.

The slot 400 includes a downlink (DL) burst 402, which may include a physical downlink control channel (PDCCH), in the initial of beginning portion of the slot 400. The DL burst 402 may include control information related to the slot 400 and may be transmitted by a base station (e.g., gNB, eNB, RSU, or global navigation satellite system (GNSS))

towards a plurality of sidelink devices. In some examples, the control information may include synchronization information to synchronize communication by a plurality of D2D/V2X devices on the sidelink carrier. It should be understood that in examples in which the sidelink devices communicate over the sidelink directly without a base station (e.g., the sidelink devices are out of the coverage area of a base station), the DL burst 402 may not be present in the slot 400.

The slot 400 further includes a listen-before-talk (LBT) section 404 within which sidelink devices may perform listen-before-talk (LBT) to gain access to the sidelink carrier. LBT enables fair sharing of the spectrum between the sidelink devices. LBT is a contention-based protocol used in wireless communication that allows several wireless devices to utilize the same spectrum or channel. For example, before a device can transmit a signal over the sidelink carrier, the device may first check (listen) to determine that the sidelink carrier is not currently in use. If the channel is not being used (e.g., the channel is idle or silent), the device can transmit the signal over the sidelink carrier.

LBT may also utilize a back-off procedure in which a device having data to send generates a random back-off time after detecting the channel is idle, and then decrements a back-off timer initialized with the random back-off time until the channel becomes busy or the timer reaches zero. If the channel becomes busy prior to expiration of the back-off timer, the device may freeze the timer. When the back-off timer expires (or decrements to zero), the device may transmit the data if the channel remains idle. It should be understood that in examples in which the sidelink devices may reserve resources in advance and/or randomly, the LBT section 404 may not be present in the slot.

The slot 400 may further include a control portion 406 and a data portion 408 that collectively form a transmit section 412 of the slot 400. In examples utilizing LBT, to gain access to the sidelink carrier, a sidelink device may transmit a known preamble, referred to herein as an LBT sequence, within the LBT section 404 before the transmit section 412. The LBT sequence may indicate the start and total length in the frequency domain of the control and data to be subsequently transmitted by the sidelink device.

Once a sidelink device has gained access to the sidelink carrier utilizing LBT within the LBT section 404 or via reserving resources (in advance and/or randomly), the sidelink device may then transmit control information within the control portion 406 and data within the data portion 408 of the transmit section 412. In some examples, the control information may be transmitted within a physical sidelink control channel (PSCCH), while the data may be transmitted within a physical sidelink shared channel (PSSCH).

In some examples, the control information may include information related to the data, such as a modulation and coding scheme utilized for the data. The data may include V2X data, such as status information (e.g., position, speed, acceleration, trajectory, etc.) and/or event information (e.g., traffic jam, icy road, fog, pedestrian crossing the road, collision, etc.), and may also include video data captured by a camera on a vehicle or coupled to an RSU. In some examples, the control information may include other control information, such as a sidelink synchronization signal (S-SS) or other suitable signals. In some examples, instead of transmitting control information within the control portion 406, the control portion 406 may be utilized to transmit additional data. In this example, the control information may be transmitted within the LBT section 404 of the slot 400.

The slot 400 may also include a common uplink (UL) burst 410, which may include a physical uplink control channel (PUCCH), in the end of the slot 400. The common UL burst 410 may include control information, such as a request to access the sidelink network, transmitted from the sidelink devices to the base station. As illustrated in FIG. 4, the end of the DL burst 402 may be separated in time from the beginning of the LBT section 404 and the end of the transmit section 412 may be separated in time from the beginning of the UL burst 410. This time separation may sometimes be referred to as a gap, a guard period, a guard interval, and/or various other suitable terms. This separation may provide time for the various sidelink devices to perform a switch-over between transmitting and receiving, or vice-versa.

Within a sidelink network, quality of service (QoS) and system performance may be affected by timing misalignments between sidelink devices. Therefore, to maintain a common synchronization of time and frequency among the sidelink devices, each of the sidelink devices may be synchronized either to a synchronization source, such as a gNB, eNB, or global navigation satellite system (GNSS), or based on a time/frequency reference within a sidelink device. One or more sidelink devices may further generate and transmit synchronization information for use by other sidelink devices in synchronizing the radio frame timing (e.g., radio frame boundaries and frame index) to the transmitting sidelink device. For example, the synchronization information may include a sidelink synchronization signal (S-SS). In some examples, the S-SS may be a sidelink synchronization block (S-SSB), which includes a sidelink primary synchronization signal (S-PSS), sidelink secondary synchronization signal (S-SSS), and a physical sidelink broadcast channel (PSBCH). The S-SSB may further include a downlink modulation reference signal (DMRS), or other signals used for synchronization.

Figure 5:
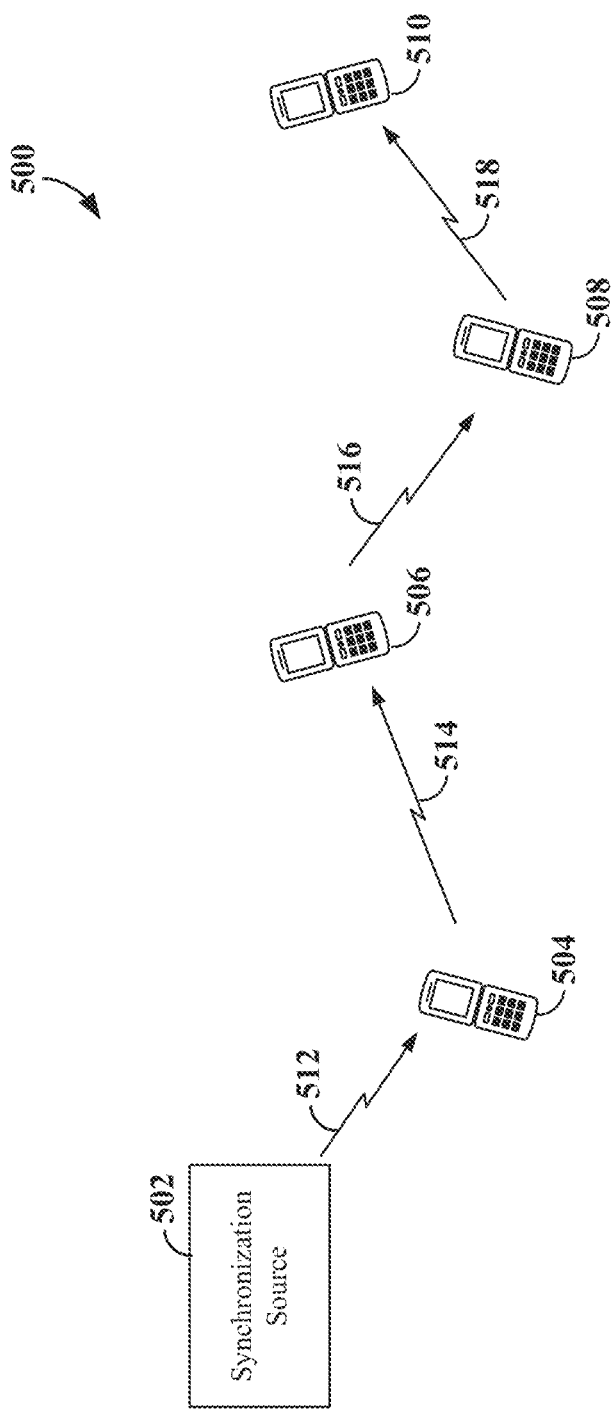
FIG. 5 is a diagram illustrating an example of synchronization in a sidelink wireless communication network according to some aspects.

FIG. 5 is a diagram illustrating an example of synchronization in a sidelink wireless communication network 500. The sidelink wireless communication network 500 includes a synchronization source 502 and a plurality of sidelink devices (e.g., UEs) 504, 506, 508, and 510. In some examples, the synchronization source 502 may include a base station (e.g., gNB, eNB, GNSS, etc.) or other suitable source of synchronization information.

The synchronization source 502 may be configured to generate and transmit a synchronization signal 512 that may be received and processed by a first UE (UE-1) 504. The first UE 504 may utilize the synchronization information in the synchronization signal 510 to synchronize the radio frame timing (e.g., radio frame boundaries and frame index) with the synchronization source 502. The first UE 504 may further be in sidelink wireless communication with a second UE (UE-2) 506. However, the second UE 506 may be out of the coverage area of the synchronization source 502. Therefore, the first UE 504 may generate and transmit a first sidelink synchronization signal (S-SS) 514 based on the synchronization established with the synchronization source 502. The first S-SS 514 may be received by the second UE 506, which may utilize the first S-SS 514 to synchronize the radio frame timing with the first UE 504.

The second UE 506 may, in turn, generate and transmit a second S-SS 516 based on the synchronization established with the first UE 504 to synchronize the timing of a third UE (UE-3) 508 that is out of the coverage area of the synchronization source 502 and the first UE 504. Similarly, the third UE 508 may generate and transmit a third S-SS 518 based on the synchronization established with the second UE 506 to synchronize the timing of a fourth UE (UE-4) 510 that is out of the coverage area of the synchronization source 502 and each of the first and second UEs 504 and 506.

Figure 6:
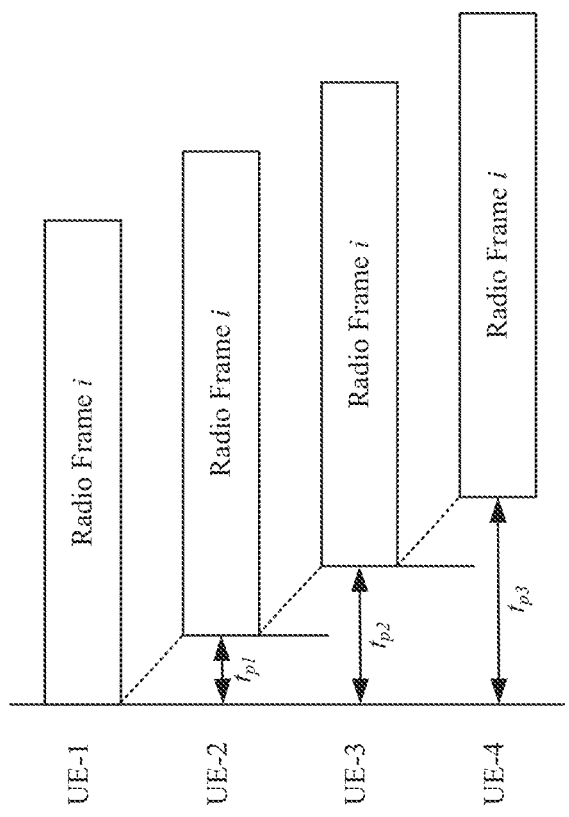
FIG. 6 is a diagram illustrating timing misalignments resulting from the propagation delay of a synchronization signal transmitted in the sidelink wireless communication network of FIG. 5 according to some aspects.

However, there is a propagation delay between each of the UEs 504, 506, 508, and 510. This propagation delay may result in timing misalignments among the UEs 504, 506, 508, and 510. For example, as shown in FIG. 6, for the first UE (UE-1), the radio frame timing of a particular radio frame (Radio Frame i) may be synchronized with the synchronization source. However, for UE-2, the radio frame timing of the Radio Frame i may be delayed by an amount equal to the propagation delay $t_{p1}$ between UE-1 and UE-2. In addition, for UE-3, the radio frame timing of the Radio Frame i may be delayed by an amount equal to the summation of the propagation delay $t_{p1}$ between UE-1 and UE-2 and the propagation delay $t_{p2}$ between UE-2 and UE-3. Similarly, for UE-4, the radio frame timing of the Radio Frame i may be delayed by an amount equal to the summation of the propagation delay $t_{p1}$ between UE-1 and UE-2, the propagation delay $t_{p2}$ between UE-2 and UE-3, and the propagation delay $t_{p3}$ to between UE-3 and UE-4.

The propagation delay amounts $t_{p1}$, $t_{p2}$, and $t_{p3}$ may each be dependent upon the respective distances between the UEs and other suitable factors. Thus, the radio frame timing errors experienced by each of the UEs receiving a S-SS (e.g., UE-2, UE-3, and UE-4) may be dependent upon the distance between each of the UEs and the number of hops from the original synchronization source. As seen in FIG. 6, the propagation delay accumulates as the number of hops from the synchronization source increases, resulting in different timing misalignments among the UEs.

Therefore, in various aspects of the disclosure, to reduce timing misalignments and alleviate the accumulation of timing errors in a sidelink network, such as a V2X network, a sidelink device (UE) receiving a S-SS from another sidelink device (UE) may determine a timing advance value indicative of the propagation delay between the sidelink devices. The sidelink device may then utilize the timing advance value, along with the S-SS, to determine the radio frame timing.

Figure 7:
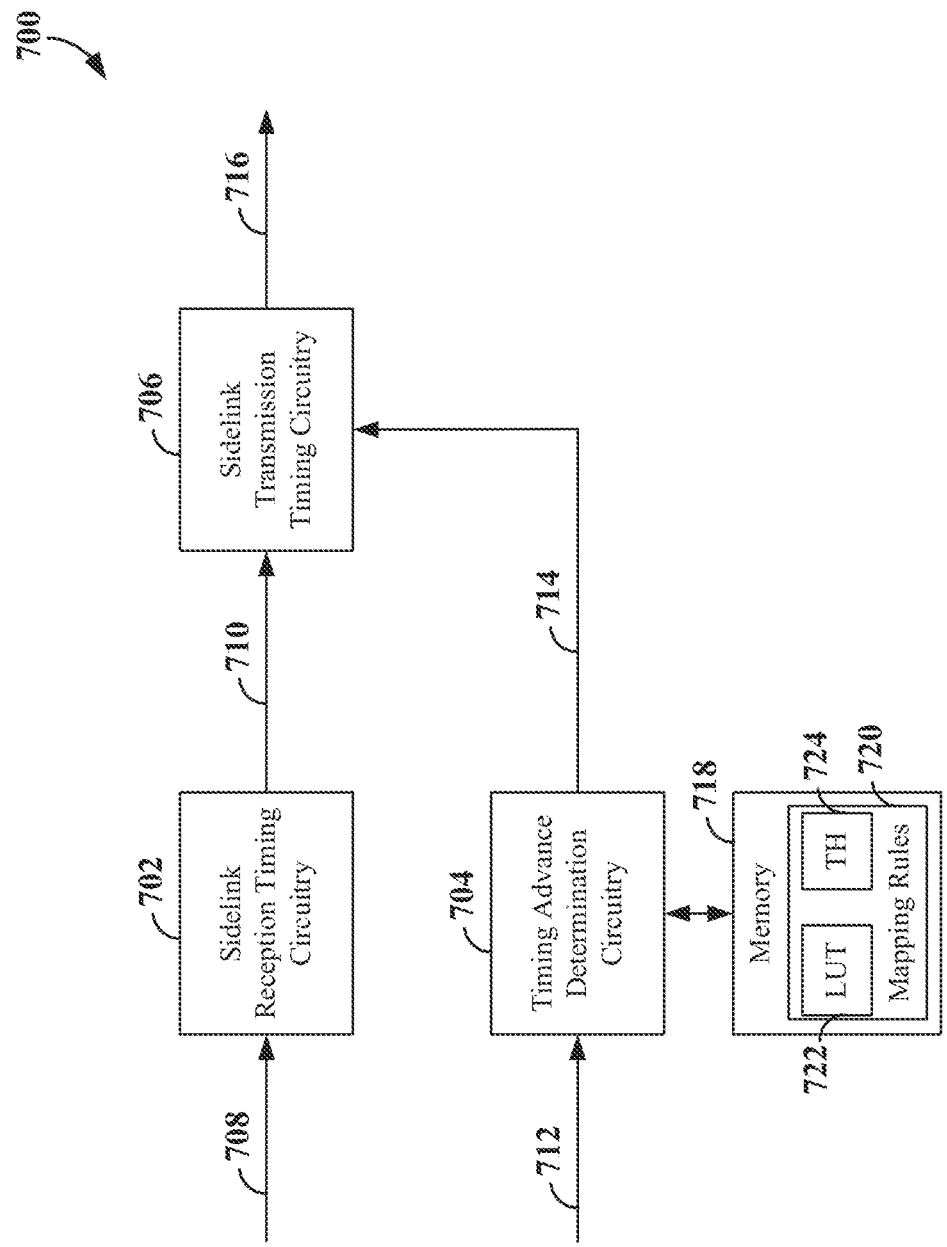
FIG. 7 is a block diagram illustrating an example of sidelink communication circuitry according to some aspects.

FIG. 7 is a block diagram illustrating an example of sidelink communication circuitry 700 configured to perform sidelink radio frame timing synchronization. The sidelink communication circuitry 700 includes sidelink reception timing circuitry 702, timing advance determination circuitry 704, sidelink transmission timing circuitry 706, and a memory 718. The memory 718 may include, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing data.

The sidelink reception timing circuitry 702 is configured to detect a sidelink synchronization signal (S-SS) 708 transmitted by another sidelink device and received within a received radio frame over a sidelink carrier. In some examples, the S-SS 708 may be a S-SSB, which includes a S-PSS, a S-SSS, and a PSBCH. The S-SSB may further include a DMRS (e.g., within the PBSCH)), or other signals used for synchronization. In some examples, the other sidelink device may be synchronized to a synchronization source (e.g., a gNB, eNB, GNSS, another sidelink device, etc.), may be self-synchronized (e.g., the other sidelink device is not synchronized to an original source, but rather is synchronized by its own timing/frequency reference), or may be synchronized to another sidelink device. The sidelink reception timing circuitry 702 may further be configured to determine a sidelink reception timing associated with the received radio frame based on the S-SS. The sidelink reception timing may indicate, for example, the radio frame boundaries (e.g., start and end of the radio frame) and frame index of the received radio frame.

The timing advance determination circuitry 704 is configured to receive timing advance information 712 and to determine a timing advance (TA) value 714 indicative of a propagation delay between the sidelink devices based on the timing advance information 712. In some examples, the timing advance information 712 may include one or more of a reference signal received power (RSRP) associated with the S-SS, a distance between the sidelink devices, or a congestion level of sidelink resources on the sidelink carrier.

In some examples, the timing advance determination circuitry 704 may be configured to determine the TA value 714 based on the RSRP associated with the S-SS. For example, the RSRP may be measured from the S-PSS, the S-SSS, the DMRS of the PBSCH, or a DMRS of the PSSCH. In some examples, the timing advance determination circuitry 704 may map the RSRP to the TA value 714 based on a set of one or more mapping rules 720 maintained in the memory 718.

In an example, the mapping rules 720 include a look-up table (LUT) 722 of a predefined mapping of each of a plurality of RSRP values to a corresponding one of a plurality of TA values, where larger TA values correspond to smaller RSRP values. The LUT 722 may further include two or more LUTs. For example, a first LUT may contain a predefined mapping of each of the plurality of RSRP values to a corresponding one of a plurality of distances between the sidelink devices, while a second LUT may contain a predefined mapping of each of the plurality of distances to a corresponding one of the plurality of TA values, where larger TA values correspond to larger distances. In this example, the timing advance determination circuitry 704 may directly map the measured RSRP to the corresponding TA value 714 based on the one or more LUTs 722.

In an example, the mapping rules 720 may include one or more thresholds 724. For example, the mapping rules 720 may include a single RSRP threshold ($RSRP_{max}$) and two TA values (e.g., a minimum TA value and a maximum TA value). When the measured RSRP is greater than $RSRP_{max}$, the timing advance determination circuitry 704 may determine the TA value ($t_{TA}$) to be a minimum timing advance value (i.e., $t_{TA}=0$ or other predefined minimum value). When the measured RSRP is less than $RSRP_{max}$, the timing advance determination circuitry 704 may determine the TA value to be a maximum TA value (i.e., $t_{TA}>0$).

In an example, the mapping rules 720 may include both the LUT 722 and one or more thresholds 724. For example, in the LUT 722, at least one of a maximum TA value ($t_{TA,max}$) and a minimum TA value ($t_{TA,min}$) may be defined, where $t_{TA,max}$ represents the maximum possible TA value that may be utilized, and $t_{TA,min}$ is zero or another predefined minimum TA value that may be utilized. In addition, at least one RSRP threshold 724 may further be defined in the LUT 722. In an example, two thresholds ($RSRP_{max}$ and $RSRP_{min}$) may be defined in the LUT 722. For example, when the measured RSRP is greater than or equal to $RSRP_{max}$, the timing advance determination circuitry 704 may determine the TA value to be equal to $t_{TA,min}$. When the measured RSRP is less than or equal to $RSRP_{min}$, the timing advance determination circuitry 704 may determine the TA value to be equal to $t_{TA,max}$. When the RSRP is between $RSRP_{max}$ and $RSRP_{min}$, the timing advance determination circuitry 704 may further determine the TA value from the LUT 722 mapping RSRP values to corresponding TA values, as indicated above.

As another example, a single RSRP threshold may be used (e.g., either $RSRP_{max}$ or $RSRP_{min}$). For example, if $RSRP_{max}$ is defined in the LUT 722, when the measured RSRP is greater than or equal to $RSRP_{max}$, the timing advance determination circuitry 704 may determine the TA value to be equal to $t_{TA,min}$. When the measured RSRP is less than $RSRP_{max}$, the timing advance determination circuitry 704 may determine the TA value from the LUT 722 mapping RSRP values to corresponding TA values, as indicated above.

In an example, the mapping rules 720 may include a fading model (e.g., an equation) that maps the RSRP value to the TA value. In general, the equation may produce smaller TA values for larger RSRP values. For example, the TA value may be inversely and non-linearly proportional to the measured RSRP (e.g., $$t_{TA} \propto \frac{1}{RSRP^\alpha},$$

where $0<\alpha<1$). In an example, the TA value may be calculated as:

$$t_{TA} = \left(\frac{RSRP_{max}}{RSRP}\right)^\alpha t_{TA,min}, \quad \text{(Equation 1)}$$

where $t_{TA,min}$ is a predefined, configured, or preconfigured lower bound of the TA value on the sidelink, $RSRP_{max}$ is a maximum RSRP threshold that is predefined, configured or preconfigured, and $\alpha$ is a predefined, configured, or preconfigured empirical value (e.g., $0<\alpha<1$). Moreover, when the measured RSRP is greater than $RSRP_{max}$, the TA value may be set to $t_{TA}=0$ or other predefined minimum TA value.

In some examples, the timing advance determination circuitry 704 may further determine the TA value 714 based on both the measured RSRP and other information, such as the transmission power of the S-SS. For example, the transmission power of the S-SS may change over time due to power control at the transmitting sidelink device. In some examples, the transmission power is known to the receiving sidelink device (e.g., the transmitting sidelink device may further transmit the transmission power to the receiving sidelink device). In this example, the receiving sidelink device may determine theta value from the measured RSRP and the S-SS transmission power. In other examples, the transmission power is unknown to the receiving sidelink device. In this example, the receiving sidelink device may assume a specific transmission power (e.g., the maximum allowed transmission power of the transmitting sidelink device) in determining the TA value.

In some examples, the timing advance determination circuitry 704 may be configured to determine the TA value 714 based on the distance between the sidelink devices. For example, the distance may be calculated based on the location of each of the transmitting and receiving sidelink devices. For example, the transmitting sidelink device may broadcast its location to the receiving sidelink device or the receiving sidelink device may obtain the location of the transmitting sidelink device from another node (e.g., a gNB, eNB, RSU, etc.). In some examples, the timing advance determination circuitry 704 may map the distance to the TA value 714 based on the set of one or more mapping rules 720 maintained in the memory 718.

In an example, the mapping rules 720 include a look-up table (LUT) 722 of a predefined mapping of each of a plurality of distances to a corresponding one of a plurality of TA values, where larger TA values correspond to larger distances. In this example, the timing advance determination circuitry 704 may directly map the distance to the corresponding TA value 714 based on the LUT 722.

In an example, the mapping rules 720 may further include one or more thresholds 724. For example, the mapping rules 720 may include a minimum distance threshold ($d_{min}$) and two TA values (e.g., a minimum TA value and a maximum TA value). When the distance is less than $d_{min}$, the timing advance determination circuitry 704 may determine the TA value ($t_{TA}$) to be the minimum TA value (i.e., $t_{TA}=0$ or other predefined minimum TA value). When the distance is greater than $d_{min}$, the timing advance determination circuitry 704 may determine the TA value to be the maximum TA value (i.e., $t_{TA>0}$).

In an example, the mapping rules 720 may include both the LUT 722 and one or more thresholds 724. For example, in the LUT 722, at least one of a maximum TA value ($t_{TA,max}$) and a minimum TA value ($t_{TA,min}$) may be defined, where $t_{TA,max}$ represents the maximum possible TA value that may be utilized, and $t_{TA,min}$ is zero or another predefined minimum possible TA value that may be utilized. In addition, at least one distance threshold 724 may further be defined in the LUT 722. In an example, two distance thresholds 724 ($d_{min}$ and $d_{max}$) may be defined in the LUT 722. For example, when the distance is less than or equal to $d_{min}$, the timing advance determination circuitry 704 may determine the TA value to be equal to $t_{TA,min}$. When the distance is greater than or equal to $d_{max}$, the timing advance determination circuitry 704 may determine the TA value to be equal to $t_{TA,max}$. When the distance is between $d_{min}$ and $d_{max}$, the timing advance determination circuitry 704 may further determine the TA value from the LUT 722 mapping distances to corresponding TA values, as indicated above.

In an example, the mapping rules 720 may include a fading model (e.g., an equation) that maps the distance to the TA value. In general, the equation may produce smaller TA values for smaller distances. For example, the TA value may be linearly proportional to the distance. In an example, the TA value may be calculated as:

$$t_{TA} = \frac{d}{d_{max}} t_{TA,max}, \quad \text{(Equation 2)}$$

where d is the distance, $t_{TA,max}$ is a predefined, configured, or preconfigured upper bound of the TA value on the sidelink, and $d_{max}$ is a maximum distance that is predefined, configured or preconfigured.

As another example, the TA value may be calculated as:

$$t_{TA} = \frac{d}{c}, \quad \text{(Equation 3)}$$

where c is a constant (e.g., the speed of light in a vacuum).

In some examples, the timing advance determination circuitry 704 may be configured to determine the TA value 714 based on the congestion level of the sidelink resources on the sidelink carrier. For example, the congestion level may include a channel busy ratio (CBR), a measured received signal strength indicator (RSSI) from sidelink signals (e.g., S-SSS, DMRS, etc.) received on the sidelink carrier, or other metrics indicating the occupation of sidelink resources. In some examples, the timing advance determination circuitry 704 may map the congestion level to the TA value 714 based on the set of one or more mapping rules 720 maintained in the memory 718.

In an example, the mapping rules 720 include a look-up table (LUT) 722 of a predefined mapping of each of a plurality of congestion levels to a corresponding one of a plurality of TA values, where larger congestion levels correspond to smaller TA values. For example, when the congestion level includes the CBR, a higher CBR indicates that more sidelink resources are being utilized, implying that more sidelink devices are transmitting, and therefore, the distances between sidelink devices may be less (thus, resulting in smaller TA values). In examples where the congestion level includes the RSSI, a larger RSSI value implies that more sidelink devices are transmitting, and therefore, the distances between sidelink device may be less (thus, resulting in smaller TA values). In this example, the timing advance determination circuitry 704 may directly map the distance to the corresponding TA value 714 based on the LUT 722.

In an example, the mapping rules 720 may further include one or more thresholds 724. For example, the mapping rules 720 may include a maximum congestion level threshold ($cl_{max}$) and two TA values (e.g., a minimum TA value and a maximum TA value). When the congestion level is greater than $cl_{max}$, the timing advance determination circuitry 704 may determine the TA value ($t_{TA}$) to be the minimum TA value (i.e., $t_{TA}=0$ or other predefined minimum TA value). When the congestion level is less than $cl_{max}$, the timing advance determination circuitry 704 may determine the TA value to be the maximum TA value (i.e., $t_{TA}>0$).

In an example, the mapping rules 720 may include both the LUT 722 and one or more thresholds 724. For example, in the LUT 722, at least one of a maximum TA value ($t_{TA,max}$) and a minimum TA value ($t_{TA,min}$) may be defined, where $t_{TA,max}$ represents the maximum possible TA value that may be utilized, and $t_{TA,min}$ is zero or another predefined minimum possible TA value that may be utilized. In addition, at least one congestion level threshold 724 may further be defined in the LUT 722. In an example, two congestion level thresholds 724 ($cl_{min}$ and $cl_{max}$) may be defined in the LUT 722. For example, when the congestion level is greater than or equal to $cl_{max}$, the timing advance determination circuitry 704 may determine the TA value to be equal to $t_{TA,min}$. When the congestion level is less than or equal to $cl_{min}$, the timing advance determination circuitry 704 may determine the TA value to be equal to $t_{TA,max}$. When the congestion level is between $cl_{min}$ and $cl_{max}$, the timing advance determination circuitry 704 may further determine the TA value from the LUT 722 mapping congestion levels to corresponding TA values, as indicated above.

Figure 8B:
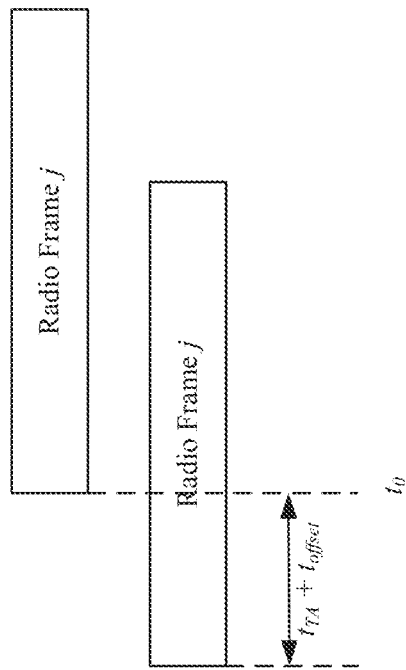
FIGS. 8A and 8B illustrate exemplary adjusted radio frame timings to accommodate for the propagation delay experienced in a sidelink wireless communication network according to some aspects.
Figure 8A:
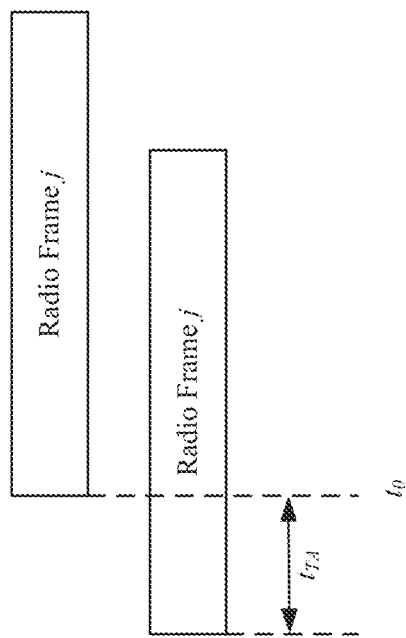

The sidelink transmission timing circuitry 706 may calculate a sidelink transmission timing 716 ($t_{trans}$) based on the sidelink reception timing 710 ($t_0$) and the TA value 714 ($t_{TA}$). The sidelink transmission timing 716 indicates the radio frame timing (e.g., radio frame boundaries and frame index) of a radio frame including information transmitted by the sidelink device over the sidelink carrier. Here, the sidelink reception timing $t_0$ represents the estimated start of the transmitted radio frame (as determined from the received radio frame timing), and the sidelink transmission timing $t_{trans}$ represents the calculated start of the transmitted radio frame. In some examples, the received radio frame may be the same radio frame as the transmitted radio frame. In other examples, the transmitted radio frame may be subsequent to the received radio frame. In some examples, the sidelink transmission timing circuitry 706 may calculate the sidelink transmission timing 716 (e.g., the calculated start of the transmitted radio frame) as the difference between the sidelink reception timing 710 (e.g., the estimated start of the transmitted radio frame) and the TA value 714 (e.g., $t_{trans}=t_0-t_{TA}$). Thus, as illustrated in the example shown in FIG. 8A, the sidelink transmission timing circuitry 706 may determine that the transmitted radio frame (Radio Frame j) starts $t_{TA}$ seconds before the estimated start time ($t_0$) indicated by the sidelink reception timing 710.

In some examples, the sidelink transmission timing circuitry 706 may further advance the sidelink reception timing 710 by an offset value $t_{offset}$. The offset value may account for switches between transmitting and receiving modes on the sidelink device. In some examples, the offset value may be a fixed, predefined value for sidelink devices, or may be predefined depending on the subcarrier spacing (SCS). For example, the offset value may be different for 15 kHz SCS and for 60 kHz SCS. In this example, the sidelink transmission timing circuitry 706 may calculate the sidelink transmission timing 716 (e.g., the start of the transmitted radio frame) as the difference between the sidelink reception timing 710 and the summation of the TA value 714 and the offset (e.g., $t_{TA}+t_{offset}$). Thus, the sidelink transmission timing 716 may be calculated as $t_{trans}=t_0-(t_{TA}+t_{offset})$. In this example, as illustrated in the example shown in FIG. 8B, the sidelink transmission timing circuitry 706 may determine that the transmitted radio frame starts $t_{TA}+t_{offset}$ seconds before the estimated start time ($t_0$) indicated by the sidelink reception timing 710.

Figure 9:
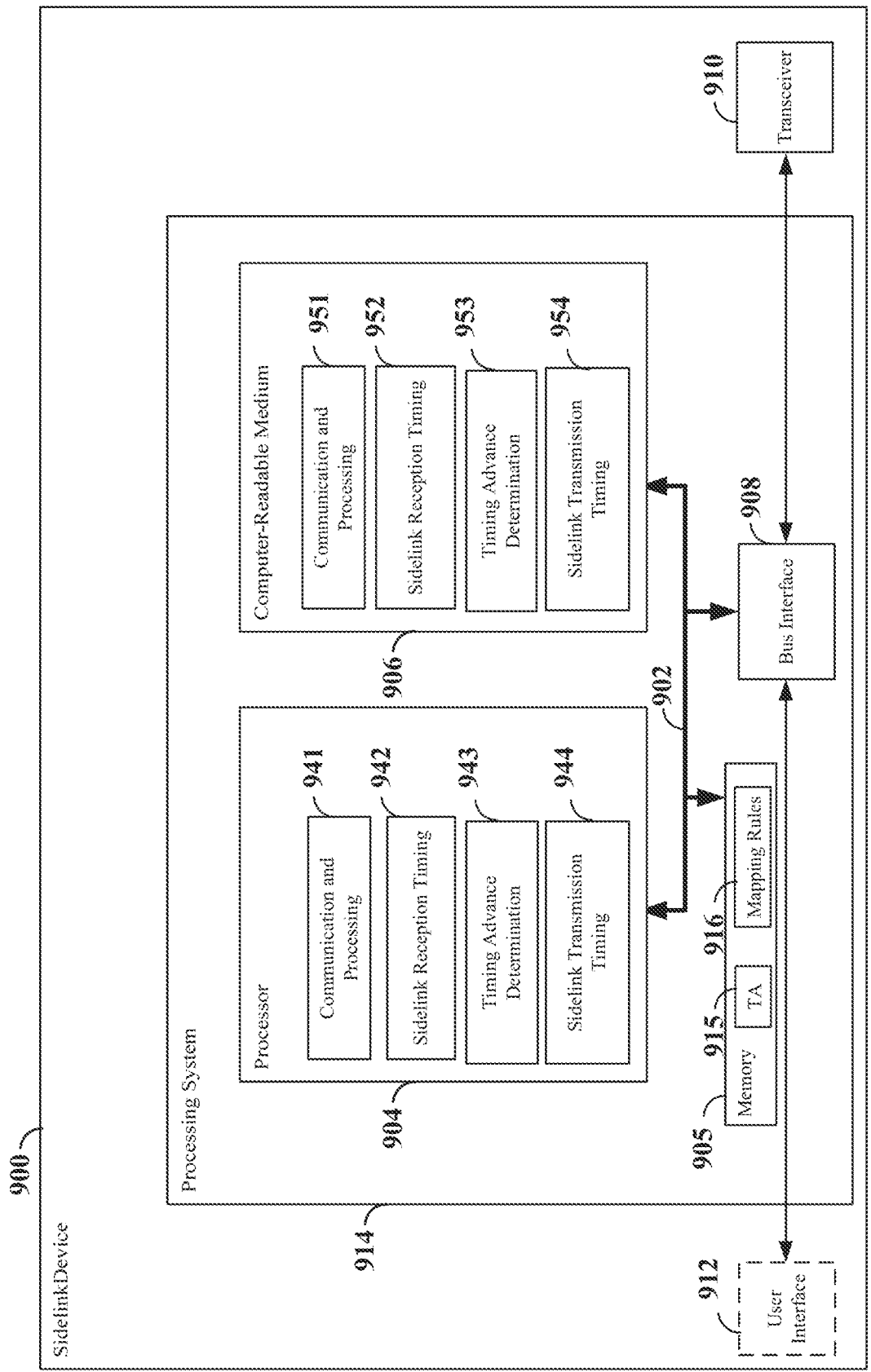
FIG. 9 is a diagram illustrating an example of a hardware implementation for a sidelink device employing a processing system according to some aspects.

FIG. 9 is a block diagram illustrating an example of a hardware implementation for a sidelink device 900 employing a processing system 914. For example, the sidelink device 900 may correspond to a UE or a V2X device, as shown and described above in reference to FIGS. 1 and/or 2.

The sidelink device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the sidelink device 900 may be configured to perform any one or more of the functions described herein. That is, the processor 904, as utilized in the sidelink device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 941 configured to communicate over a sidelink carrier to exchange sidelink control information and sidelink data with other sidelink devices. The sidelink carrier may be time-divided into a plurality of radio frames, each of which may be time-divided into a plurality of subframes and slots, such as the slot shown in FIG. 4. In some examples, the communication and processing circuitry 941 may be configured to transmit a PSCCH, which may include a sidelink synchronization signal (S-SS), other control information, and/or pilot signals, and/or a PSSCH, which may include sidelink data, within a radio frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS and a TA value, as described herein). The communication and processing circuitry 941 may further be configured to execute communication and processing software 951 stored on the computer-readable medium 906 to implement one or more functions described herein.

The processor 904 may further include sidelink reception timing circuitry 942, which may, in some examples, correspond to the sidelink reception timing circuitry 702 shown in FIG. 7. The sidelink reception timing circuitry 942 may be configured to detect a sidelink synchronization signal (S-SS) 708 transmitted by another sidelink device and received within a received radio frame over a sidelink carrier. The sidelink reception timing circuitry 942 may further be configured to determine a sidelink reception timing associated with the received radio frame based on the S-SS. The sidelink reception timing circuitry 942 may further be configured to execute sidelink reception timing software 952 stored on the computer-readable medium 906 to implement one or more of the functions herein.

The processor 904 may further include timing advance determination circuitry 943, which may, in some examples, correspond to the timing advance determination circuitry 704 shown in FIG. 7. The timing advance determination circuitry 943 may be configured to determine a timing advance (TA) value 915 indicative of a propagation delay between the sidelink devices based on timing advance information, and to store the TA value 915 in the memory 905. In some examples, the timing advance information may include one or more of a reference signal received power (RSRP) associated with the S-SS, a distance between the sidelink devices, or a congestion level of sidelink resources on the sidelink carrier. In some examples, the timing advance determination circuitry 943 may be configured to determine the TA value 915 utilizing a set of one or more mapping rules 916 mapping the timing advance information to TA values. The mapping rules 916 may be maintained, for example, in memory 905. In some examples, the mapping rules 916 may include one or more look-up table, one or more thresholds, and/or one or more fading models. The timing advance determination circuitry 943 may further be configured to execute timing advance determination software 953 stored on the computer-readable medium 906 to implement one or more of the functions described herein.

The processor 904 may further include sidelink transmission timing circuitry 944, which may, in some examples, correspond to the sidelink transmission timing circuitry 706 shown in FIG. 7. In some examples, sidelink transmission timing circuitry 944 may be configured to calculate a sidelink transmission timing based on the sidelink reception timing determined by the sidelink reception timing circuitry 942 and the TA value determined by the timing advance determination circuitry 943. For example, the sidelink transmission timing may indicate the start of a radio frame within which the communication and processing circuitry 941 may transmit information to other sidelink devices. In some examples, the sidelink transmission timing circuitry 944 may further calculate the sidelink transmission timing based on the timing advance value and an offset value. In some examples, the offset value may be a fixed, predefined value for sidelink devices, or may be predefined depending on the subcarrier spacing (SCS). The sidelink transmission timing circuitry 944 may further be configured to execute sidelink transmission software 954 stored on the computer-readable medium 906 to implement one or more of the functions described herein.

Figure 10:
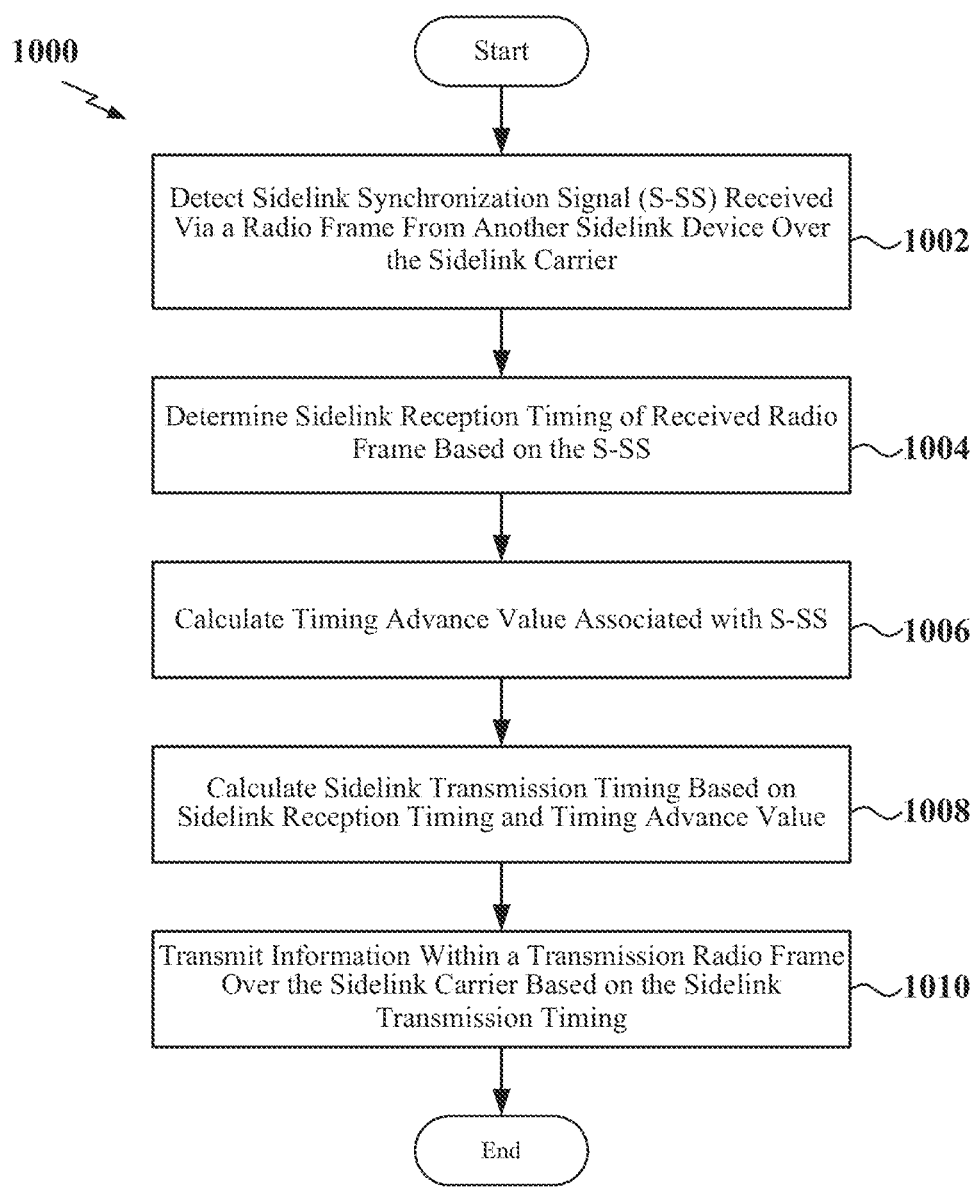
FIG. 10 is a flow chart of an exemplary method for wireless communication over a sidelink carrier according to some aspects.

FIG. 10 is a flow chart 1000 of a method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1002, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1004, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1006, the sidelink device may determine a timing advance (TA) value indicative of a propagation delay from the other sidelink device to the sidelink device. In some examples, the sidelink device may determine the TA value based on one or more of a reference signal received power (RSRP) associated with the S-SS, a distance between the sidelink devices, or a congestion level of sidelink resources on the sidelink carrier. In some examples, the sidelink device may determine the TA value based on the RSRP and a transmission power of the S-SS. In some examples, the sidelink device may determine the TA value utilizing a set of one or more mapping rules (e.g., one or more look-up tables (LUT(s)), one or more thresholds (Threshold(s)), and/or a fading model). For example, the timing advance determination circuitry 943 shown and described above in connection with FIG. 9 may determine the TA value.

At block 1008, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 9 may calculate the sidelink transmission timing.

At block 1010, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 11:
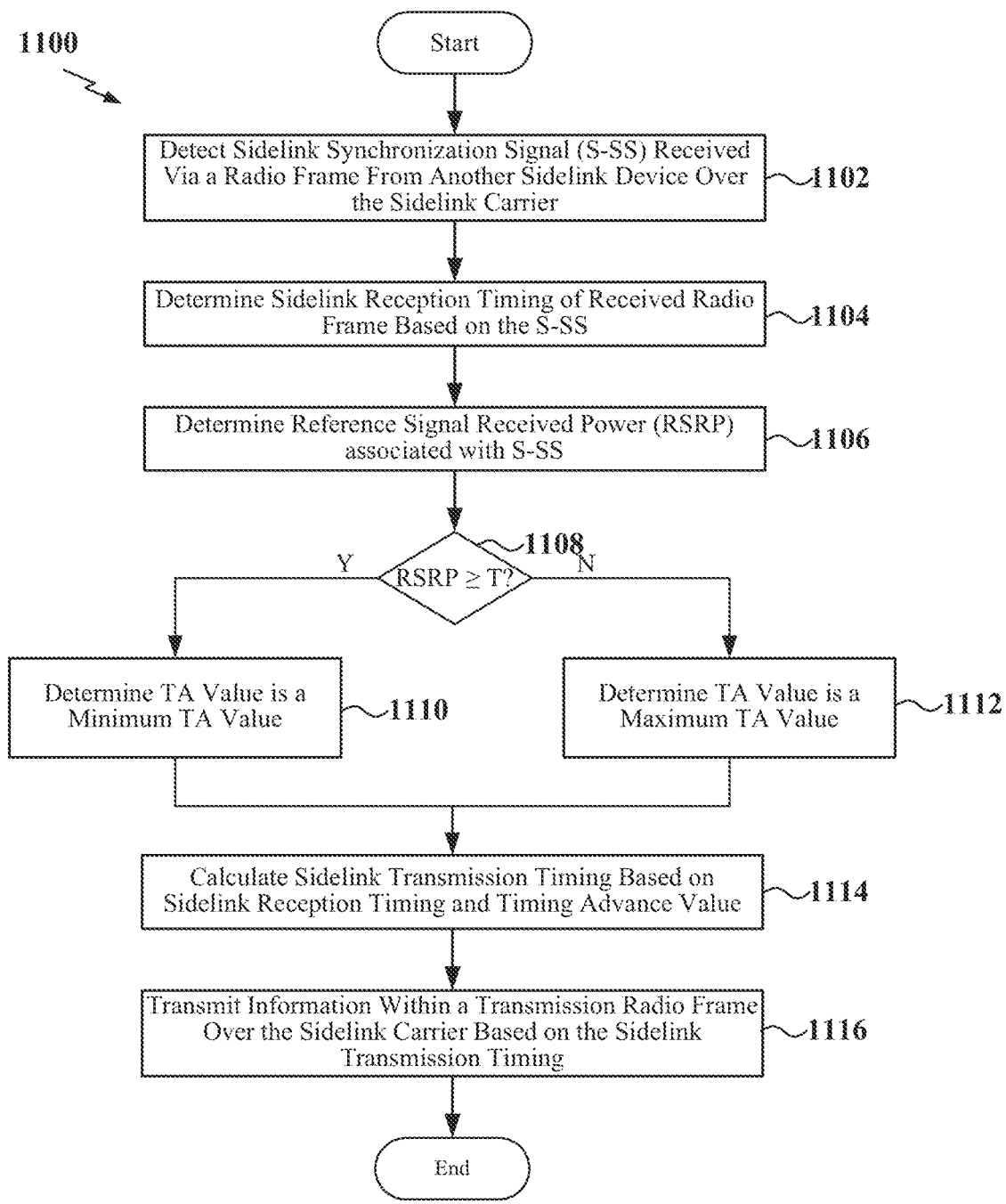
FIG. 11 is a flow chart of another exemplary method for wireless communication over a sidelink carrier according to some aspects.

FIG. 11 is a flow chart 1100 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1102, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1104, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1106, the sidelink device may determine a reference signal received power (RSRP) associated with the S-SS. For example, the RSRP may be measured from the S-PSS, the S-SSS, the DMRS of the PBSCH, or a DMRS of the PSSCH. For example, the timing advance determination circuitry 943 shown and described above in connection with FIG. 9 may determine the RSRP associated with the S-SS.

At block 1108, the sidelink device may determine whether the RSRP associated with the S-SS is greater than or equal to an RSRP threshold. If the RSRP is greater than or equal to the RSRP threshold (Y branch of block 1108), at block 1110, the sidelink device may determine a timing advance (TA) value to be a minimum TA value (i.e., $t_{TA}=0$ or other predefined minimum value). However, if the RSRP is less than the RSRP threshold (N branch of block 1108), at block 1112, the sidelink device may determine the TA value to be a maximum TA value (i.e., $t_{TA}>0$). For example, the timing advance determination circuitry 943 shown and described above in connection with FIG. 9 may determine the TA value by comparing the measured RSRP with the RSRP threshold.

At block 1114, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. For example, the sidelink transmission timing circuitry 944 shown and described above in connection with FIG. 8 may calculate the sidelink transmission timing.

At block 1116, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 12:
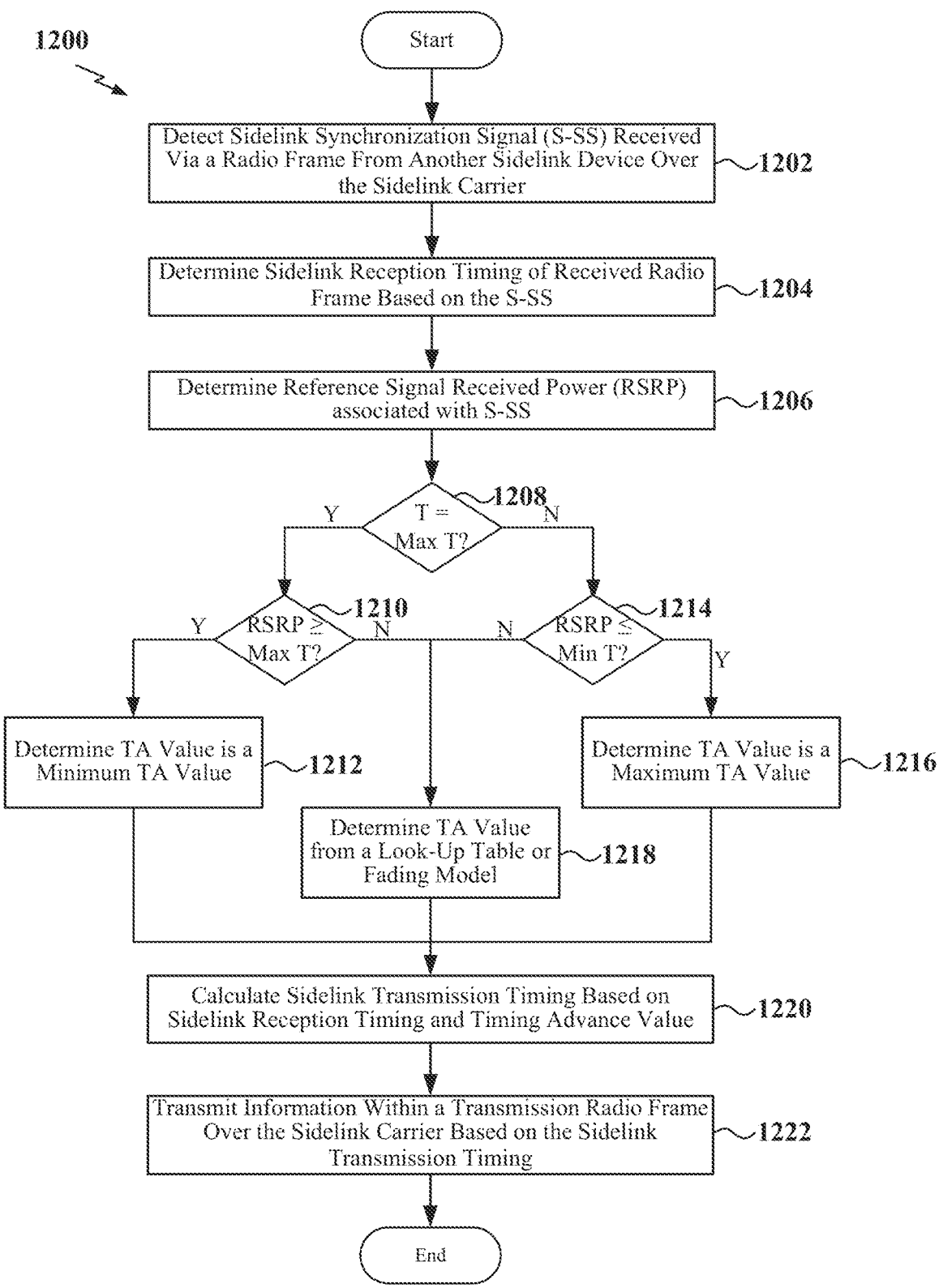
FIG. 12 is a flow chart of another exemplary method for wireless communication over a sidelink carrier according to some aspects.

FIG. 12 is a flow chart 1200 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1202, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1204, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1206, the sidelink device may determine a reference signal received power (RSRP) associated with the S-SS. For example, the RSRP may be measured from the S-PSS, the S-SSS, the DMRS of the PBSCH, or a DMRS of the PSSCH. For example, the timing advance determination circuitry 943 shown and described above in connection with FIG. 9 may determine the RSRP associated with the S-SS.

At block 1208, the sidelink device may determine whether an RSRP threshold is equal to a maximum RSRP threshold. If the RSRP threshold is equal to the maximum RSRP threshold (Y branch of block 1208), at block 1210, the sidelink device may determine whether the RSRP associated with the S-SS is greater than or equal to the maximum RSRP threshold. If the RSRP is greater than or equal to the maximum RSRP threshold (Y branch of block 1210), at block 1212, the sidelink device may determine a timing advance (TA) value to be a minimum TA value (i.e., $t_{TA}=0$ or other predefined minimum value). However, if the RSRP threshold is not equal to the maximum RSRP threshold (e.g., the RSRP threshold is equal to a minimum RSRP threshold) (N branch of block 1208), at block 1214, the sidelink device may determine whether the RSRP associated with the S-SS block is less than or equal to the minimum RSRP threshold. If the RSRP is less than or equal to the minimum RSRP threshold (Y branch of block 1214), at block 1216, the sidelink device may determine the TA value to be a maximum TA value (i.e., $t_{TA}>0$).

However, if the RSRP associated with the S-SS is between the maximum RSRP threshold and the minimum RSRP threshold (N branches of blocks 1210 and 1214), at block 1218, the sidelink device may determine the TA value from a look-up table or a fading model. As an example, the look-up table may map RSRP values to corresponding TA values. As an example, the fading model (e.g., an equation) may produce smaller TA values for larger RSRP values. For example, the TA value may be inversely and non-linearly proportional to the measured RSRP. For example, the timing advance determination circuitry 943 shown and described above in connection with FIG. 9 may determine the TA value by comparing the measured RSRP with maximum and minimum RSRP thresholds.

At block 1220, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 8 may calculate the sidelink transmission timing.

At block 1222, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 13:
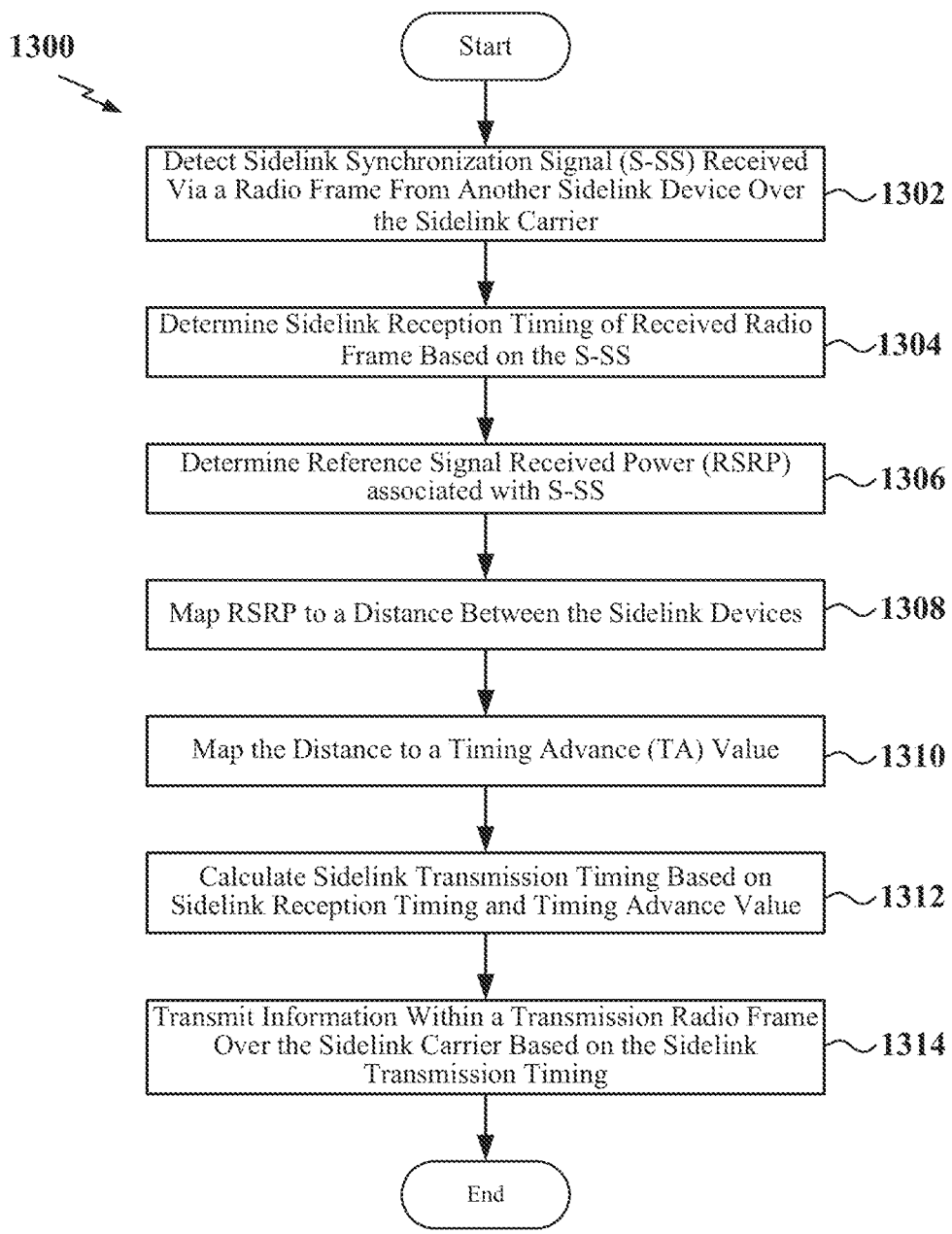
FIG. 13 is a flow chart of another exemplary method for wireless communication over a sidelink carrier according to some aspects.

FIG. 13 is a flow chart 1300 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1302, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1304, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1306, the sidelink device may determine a reference signal received power (RSRP) associated with the S-SS. For example, the RSRP may be measured from the S-PSS, the S-SSS, the DMRS of the PBSCH, or a DMRS of the PSSCH. For example, the timing advance determination circuitry 943 shown and described above in connection with FIG. 9 may determine the RSRP associated with the S-SS.

At block 1308, the sidelink device may map the measured RSRP to a distance between the sidelink devices. At block 1310, the sidelink device may map the distance between the sidelink devices to a timing advance (TA) value. For example, a first LUT may contain a predefined mapping of each of a plurality of RSRP values to a corresponding one of a plurality of distances between the sidelink devices, while a second LUT may contain a predefined mapping of each of the plurality of distances to a corresponding one of the plurality of TA values, where larger TA values correspond to larger distances. For example, the timing advance determination circuitry 943 shown and described above in connection with FIG. 9 may determine the TA value based on the measured RSRP and distance between the sidelink devices.

At block 1312, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 8 may calculate the sidelink transmission timing.

At block 1314, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 14:
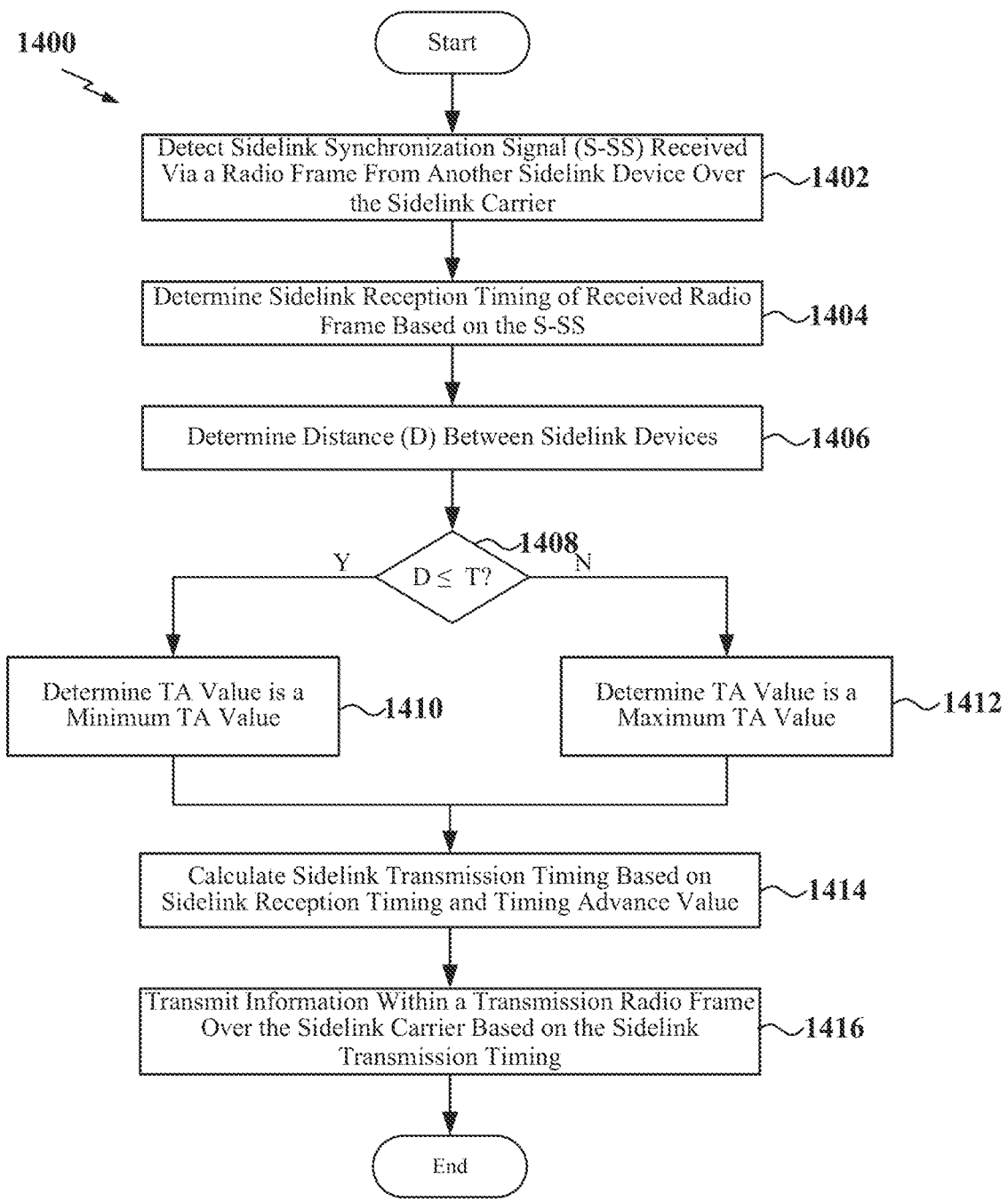
FIG. 14 is a flow chart of another exemplary method for wireless communication over a sidelink carrier according to some aspects.

FIG. 14 is a flow chart 1400 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1402, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1404, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1406, the sidelink device may determine a distance between the sidelink devices. For example, the distance may be calculated based on the location of each of the sidelink devices. For example, the timing advance determination circuitry 943 shown and described above in connection with FIG. 9 may determine the distance between the sidelink devices.

At block 1408, the sidelink device may determine whether the distance between the sidelink devices is less than or equal to a distance threshold. If the distance between the sidelink devices is less than or equal to the distance threshold (Y branch of block 1408), at block 1410, the sidelink device may determine a timing advance (TA) value to be a minimum TA value (i.e., $t_{TA}=0$ or other predefined minimum value). However, if the distance between the sidelink devices is greater than the distance threshold (N branch of block 1408), at block 1412, the sidelink device may determine the TA value to be a maximum TA value (i.e., $t_{TA}>0$). For example, the timing advance determination circuitry 943 shown and described above in connection with FIG. 9 may determine the TA value by comparing the distance between the sidelink devices with the distance threshold.

At block 1414, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 8 may calculate the sidelink transmission timing.

At block 1416, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 15:
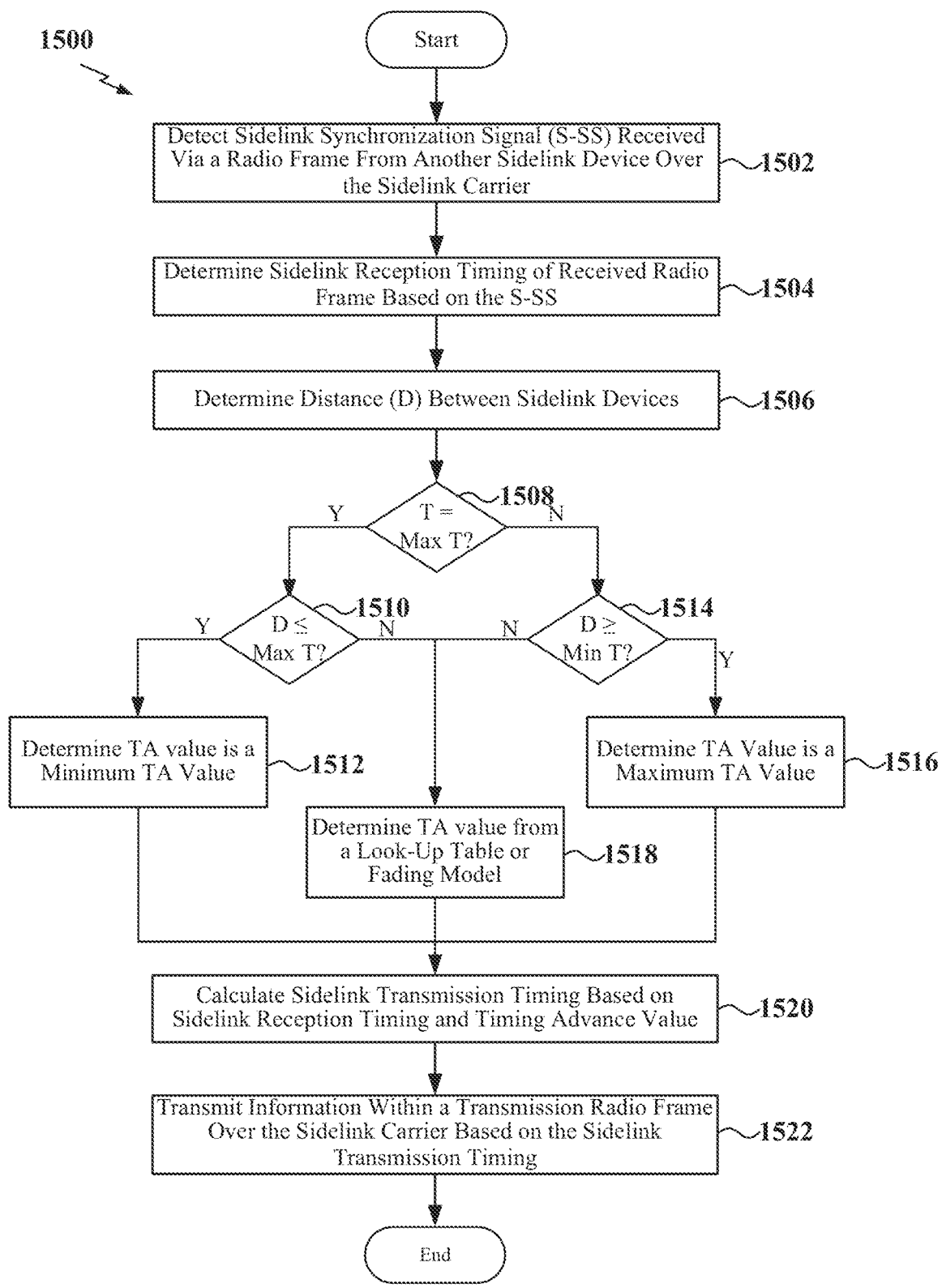
FIG. 15 is a flow chart of another exemplary method for wireless communication over a sidelink carrier according to some aspects.

FIG. 15 is a flow chart 1500 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1502, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1504, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1506, the sidelink device may determine a distance between the sidelink devices. For example, the distance may be calculated based on the location of each of the sidelink devices. For example, the timing advance determination circuitry 943 shown and described above in connection with FIG. 9 may determine the distance between the sidelink devices.

At block 1508, the sidelink device may determine whether a distance threshold is equal to a maximum distance threshold. If the distance threshold is equal to the maximum distance threshold (Y branch of block 1508), at block 1510, the sidelink device may determine whether the distance between the sidelink devices is less than or equal to the maximum distance threshold. If the distance between the sidelink devices is less than or equal to the maximum distance threshold (Y branch of block 1510), at block 1512, the sidelink device may determine a timing advance (TA) value to be a minimum TA value (i.e., $t_{TA}=0$ or other predefined minimum value). However, if the distance threshold is not equal to the maximum distance threshold (e.g., the distance threshold is equal to a minimum distance threshold) (N branch of block 1508), at block 1514, the sidelink device may determine whether the distance between the sidelink devices is greater than or equal to the minimum distance threshold. If the distance between the sidelink devices is greater than or equal to the minimum distance threshold (Y branch of block 1514), at block 1516, the sidelink device may determine the TA value to be a maximum TA value (i.e., $t_{TA}>0$).

However, if the distance between the sidelink devices is greater than the maximum distance threshold or less than the minimum distance threshold (N branches of blocks 1510 and 1514), at block 1518, the sidelink device may determine the TA value from a look-up table or a fading mode. As an example, the look-up table may map distances to corresponding TA values. As another example, the fading model (e.g., an equation) may produce smaller TA values for smaller distances. For example, the TA value may be linearly proportional to the distance. For example, the timing advance determination circuitry 943 shown and described above in connection with FIG. 9 may determine the TA value by comparing the distance between the sidelink devices with maximum and minimum RSRP thresholds.

At block 1520, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 8 may calculate the sidelink transmission timing.

At block 1522, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Figure 16:
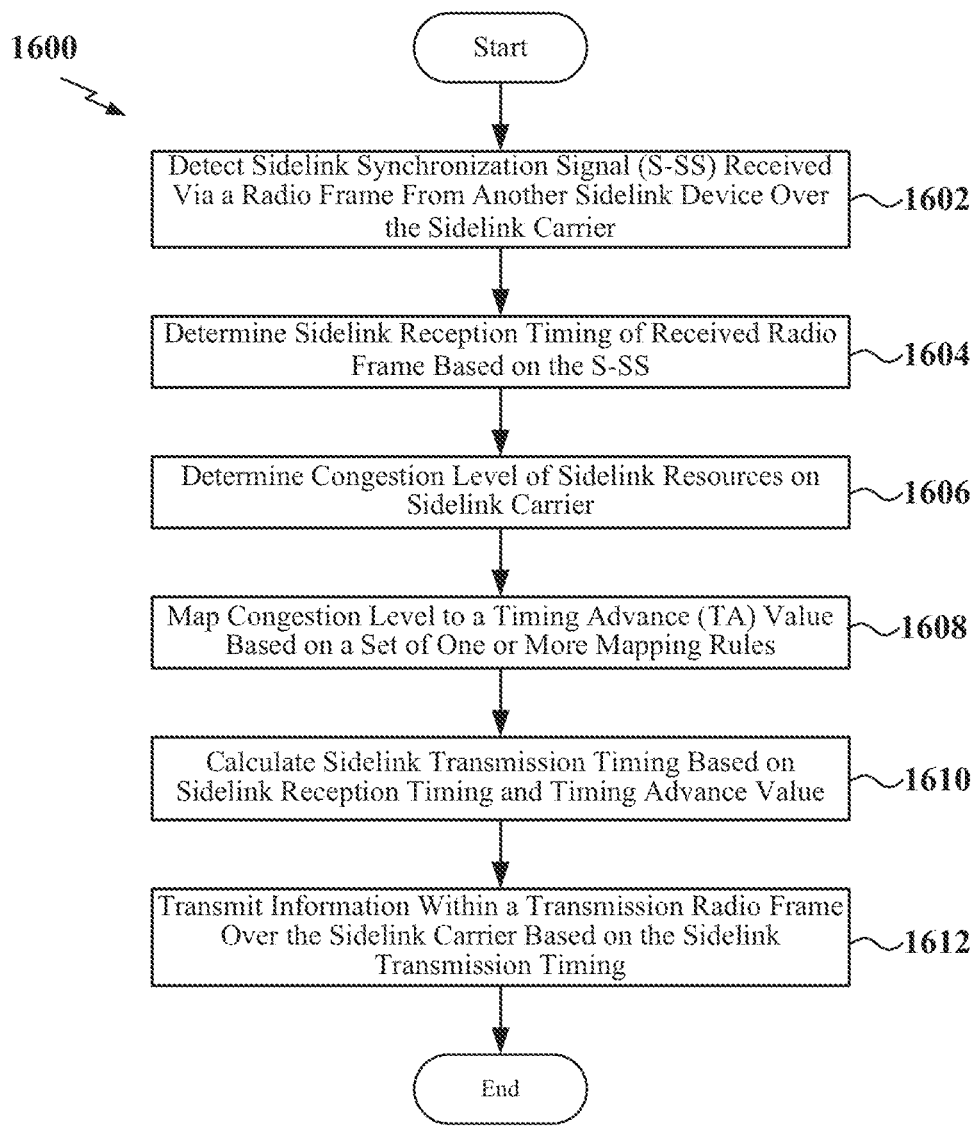
FIG. 16 is a flow chart of another exemplary method for wireless communication over a sidelink carrier according to some aspects.

FIG. 16 is a flow chart 1600 of another method for wireless communication over a sidelink carrier. As described below, some or all illustrated features may be omitted in a particular implementation within the scope of the present disclosure, and some illustrated features may not be required for implementation of all embodiments. In some examples, the method may be performed by the sidelink device 900, as described above and illustrated in FIG. 9, by a processor or processing system, or by any suitable means for carrying out the described functions.

At block 1602, the sidelink device may detect a sidelink synchronization signal (S-SS) received via a radio frame over the sidelink carrier. The S-SS may be transmitted by another sidelink device in wireless communication with the sidelink device. For example, the communication and processing circuitry 941, together with the transceiver 910, shown and described above in connection with FIG. 9 may detect the S-SS.

At block 1604, the sidelink device may determine the sidelink reception timing associated with the received radio frame based on the S-SS. The sidelink reception timing may indicate the radio frame boundaries (e.g., start and end times) and frame index of the received radio frame. For example, the sidelink reception timing circuitry 942 shown and described above in connection with FIG. 9 may determine the sidelink reception timing.

At block 1606, the sidelink device may determine a congestion level of sidelink resources on the sidelink carrier. For example, the congestion level may include a channel busy ratio (CBR), a measured received signal strength indicator (RSSI) from sidelink signals (e.g., S-SSS, DMRS, etc.) received on the sidelink carrier, or other metrics indicating the occupation of sidelink resources. For example, the timing advance determination circuitry 943 shown and described above in connection with FIG. 9 may determine the congestion level.

At block 1608, the sidelink device may map the congestion level to a timing advance (TA) value. For example, a LUT may contain a predefined mapping of each of a plurality of congestion levels to a corresponding one of a plurality of TA values, where larger congestion levels correspond to smaller TA values. For example, the timing advance determination circuitry 943 shown and described above in connection with FIG. 9 may determine the TA value based on the congestion level.

At block 1610, the sidelink device may calculate the sidelink transmission timing based on the sidelink reception timing and the TA value. In some examples, the sidelink device may calculate the start of a transmitted radio frame (e.g., a radio frame including information transmitted by the sidelink device) based on the difference between the sidelink reception timing (e.g., the estimated start of the transmitted radio frame based on the S-SS) and the TA value. In some examples, the sidelink device may calculate the start of the transmitted radio frame based on the difference between the sidelink reception timing and a combination (summation) of the TA value and an offset value. In some examples, the offset value may include predefined value or may be variable based on a subcarrier spacing of the sidelink carrier. For example, the sidelink transmission timing circuitry 944 shown and described above in connection with FIG. 8 may calculate the sidelink transmission timing.

At block 1612, the sidelink device may transmit information within the transmitted radio frame over the sidelink carrier based on the sidelink transmission timing. For example, the communication and processing circuitry 941, together with the transceiver 910, shown and described above in connection with FIG. 9 may transmit information within the transmitted radio frame.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 7 and/or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first sidelink device, the method comprising:
    detecting a sidelink synchronization signal received via a received radio frame over a sidelink carrier, wherein the sidelink synchronization signal originates from a second sidelink device;
    determining sidelink reception timing associated with the received radio frame based on the sidelink synchronization signal;
    determining a sidelink timing advance value indicative of a propagation delay from the second sidelink device to the first sidelink device by mapping a parameter associated with sidelink communication to the sidelink timing advance value based on a set of one or more mapping rules;
    calculating sidelink transmission timing based on the sidelink reception timing and the sidelink timing advance value; and
    transmitting information within a transmitted radio frame over the sidelink carrier based on the sidelink transmission timing.

2. The method of claim 1, wherein the information comprises an additional sidelink synchronization signal generated based on the sidelink transmission timing.

3. The method of claim 1, wherein
    the parameter is a reference signal received power (RSRP) associated with the sidelink synchronization signal.

4. The method of claim 3, wherein the set of one or more mapping rules comprises a look-up table mapping each of a plurality of RSRP values to a corresponding one of a plurality of timing advance values.

5. The method of claim 3, wherein the set of one or more mapping rules comprise an RSRP threshold.

6. The method of claim 5, wherein the sidelink timing advance value comprises a minimum timing advance value when the parameter is the RSRP and the RSRP is greater than or equal to the RSRP threshold and a maximum timing advance value when the RSRP is less than the RSRP threshold.

7. The method of claim 5, wherein the parameter is an RSRP and:

the RSRP threshold comprises at least one of a maximum RSRP threshold and a minimum RSRP threshold;
the sidelink timing advance value comprises a minimum timing advance value when the RSRP threshold comprises the maximum RSRP threshold and the RSRP is greater than or equal to the maximum RSRP threshold; and
the sidelink timing advance value comprises a maximum timing advance value when the RSRP threshold comprises the minimum RSRP threshold and the RSRP is less than or equal to the minimum RSRP threshold.

8. The method of claim 7, wherein the sidelink timing advance value is determined from a look-up table mapping RSRP values to corresponding timing advance values when the RSRP is between the maximum RSRP threshold and the minimum RSRP threshold.

9. The method of claim 7, wherein the sidelink timing advance value is inversely and non-linearly proportional to the RSRP when the RSRP is between the maximum RSRP threshold and the minimum RSRP threshold.

10. The method of claim 3, wherein determining the sidelink timing advance value further comprises:
determining the sidelink timing advance value based on the RSRP associated with the sidelink synchronization signal and a transmission power of the sidelink synchronization signal.

11. The method of claim 3, wherein the set of one or more mapping rules comprises a first set of one more mapping rules and a second set of one or more mapping rules, and mapping the RSRP to the sidelink timing advance value based on the set of one or more mapping rules further comprises:
mapping the RSRP to a distance between the first sidelink device and the second sidelink device based on the first set of one or more mapping rules; and
mapping the distance to the sidelink timing advance value based on the second set of one or more mapping rules.

12. The method of claim 1, wherein the parameter is a distance between the first sidelink device and the second sidelink device and determining the sidelink timing advance value by mapping the parameter to the sidelink timing advance value based on the set of one or more mapping rules further comprises:
determining the sidelink timing advance value based on the distance between the first sidelink device and the second sidelink device.

13. The method of claim 12, wherein determining the sidelink timing advance value based on the distance between the first sidelink device and the second sidelink device further comprises:
mapping the distance to the sidelink timing advance value based on the set of one or more mapping rules.

14. The method of claim 13, wherein the set of one or more mapping rules comprises a look-up table mapping each of a plurality of distances to a corresponding one of a plurality of timing advance values.

15. The method of claim 13, wherein the set of one or more mapping rules comprise a distance threshold.

16. The method of claim 15, wherein the sidelink timing advance value comprises a minimum timing advance value when the distance is less than or equal to the distance threshold and a maximum timing advance value when the distance is greater than the distance threshold.

17. The method of claim 15, wherein:
the distance threshold comprises at least one of a maximum distance threshold and a minimum distance threshold;
the sidelink timing advance value comprises a minimum timing advance value when the distance threshold comprises the minimum distance threshold and the distance is less than or equal to the minimum distance threshold; and
the sidelink timing advance value comprises a maximum timing advance value when the distance threshold comprise the maximum distance threshold and the distance is greater than or equal to the maximum distance threshold.

18. The method of claim 17, wherein the sidelink timing advance value is determined from a look-up table mapping distance values to corresponding timing advance values when the distance is between the maximum distance threshold and the minimum distance threshold.

19. The method of claim 17, wherein the sidelink timing advance value is linearly proportional to the distance when the distance is between the maximum distance threshold and the minimum distance threshold.

20. The method of claim 1, wherein the parameter is a congestion level of sidelink resources on the sidelink carrier, and determining the sidelink timing advance value further comprises:
determining the sidelink timing advance value based on the congestion level of sidelink resources on the sidelink carrier.

21. The method of claim 20, wherein the congestion level comprises a channel busy ratio or a received signal strength indicator measured from one or more sidelink signals carried on the sidelink carrier.

22. The method of claim 20, wherein determining the sidelink timing advance value based on the congestion level of the sidelink resources on the sidelink carrier further comprises:
mapping the congestion level to the sidelink timing advance value based on the set of one or more mapping rules.

23. The method of claim 22, wherein the set of one or more mapping rules comprises a look-up table mapping each of a plurality of congestion levels to a corresponding one of a plurality of timing advance values such that smaller congestion levels map to larger timing advance values.

24. The method of claim 1, wherein calculating the sidelink transmission timing based on the sidelink reception timing and the sidelink timing advance value further comprises:
calculating the sidelink transmission timing based on the sidelink reception timing and a summation of the sidelink timing advance value and an offset value.

25. The method of claim 24, wherein the offset value comprises a predefined value or is variable based on a subcarrier spacing of the sidelink carrier.

26. The method of claim 1, wherein the sidelink reception timing and the sidelink transmission timing each comprise radio frame boundaries and a frame index.

27. A first sidelink device, comprising:
a processor;
a wireless transceiver communicatively coupled to the processor and configured to communicate over a sidelink carrier; and
a memory communicatively coupled to the processor, wherein the processor and the memory are configured to:
detect a sidelink synchronization signal received via a received radio frame over the sidelink carrier, wherein the sidelink synchronization signal originates from a second sidelink device;

determine sidelink reception timing associated with the received radio frame based on the sidelink synchronization signal;
determine a sidelink timing advance value indicative of a propagation delay from the second sidelink device to the first sidelink device by mapping a parameter associated with sidelink communication to the sidelink timing advance value based on a set of one or more mapping rules;
calculate sidelink transmission timing based on the sidelink reception timing and the sidelink timing advance value; and
transmit information within a transmitted radio frame over the sidelink carrier based on the sidelink transmission timing.

28. The first sidelink device of claim 27, wherein the information comprises an additional sidelink synchronization signal generated based on the sidelink transmission timing.

29. The first sidelink device of claim 27, wherein the parameter is
a reference signal received power (RSRP) associated with the sidelink synchronization signal, a transmission power of the sidelink synchronization signal, a distance between the first sidelink device and the second sidelink device, or a congestion level of sidelink resources on the sidelink carrier.

30. The first sidelink device of claim 27, wherein the parameter is a distance between the first sidelink device and the second sidelink device and to determine the sidelink timing advance value the processor and the memory are further configured to:
determine the sidelink timing advance value based on the distance between the first sidelink device and the second sidelink device.

* * * * *